US012490295B2

(12) United States Patent
Yamamoto et al.

(10) Patent No.: US 12,490,295 B2
(45) Date of Patent: Dec. 2, 2025

(54) TERMINAL AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 18/762,291

(22) Filed: Jul. 2, 2024

(65) Prior Publication Data

US 2024/0357635 A1  Oct. 24, 2024

Related U.S. Application Data

(63) Continuation of application No. 17/605,204, filed as application No. PCT/JP2020/002159 on Jan. 22, 2020, now Pat. No. 12,052,746.
(Continued)

(30) Foreign Application Priority Data

May 9, 2019 (JP) ................................ 2019-089057

(51) Int. Cl.
*H04W 72/12* (2023.01)
*H04W 28/02* (2009.01)
(Continued)

(52) U.S. Cl.
CPC .......... *H04W 72/56* (2023.01); *H04W 72/23* (2023.01)

(58) Field of Classification Search
CPC . H04W 72/23; H04W 72/0446; H04W 72/56; H04W 72/1268; H04W 72/569;
(Continued)

(56) References Cited

U.S. PATENT DOCUMENTS 11,374,719 B2 *  6/2022 Liu .................. H04W 72/56
11,601,926 B2 *  3/2023 Yamamoto ............ H04L 1/0009
(Continued)

FOREIGN PATENT DOCUMENTS

WO         2017195721 A1    11/2017
WO         2018231728 A1    12/2018
WO     WO 2020206605 A1    10/2020

OTHER PUBLICATIONS

Ericsson, "On intra-UE prioritization enablers," Tdoc R1-1906097, Agenda Item: 7.2.6.7, 3GPP TSG RAN WG1 Meeting #97, Reno, USA, May 13-17, 2019, 11 pages.
(Continued)

*Primary Examiner* — Sai Aung
(74) *Attorney, Agent, or Firm* — Seed Intellectual Property Law Group LLP

(57) ABSTRACT

The objective of the present invention is to implement appropriate radio communication processing in accordance with required criteria. This terminal is provided with: a control circuit which determines a method for determining a priority level of a first channel and a second channel having mutually overlapping resource allocations in the time domain, on the basis of a parameter relating to control information indicating the allocations of the first channel and the second channel respectively; and a communication circuit for transmitting or receiving a signal to or from at least one of the first channel and the second channel, on the basis of the priority level.

8 Claims, 17 Drawing Sheets

Related U.S. Application Data

(60) Provisional application No. 62/839,128, filed on Apr. 26, 2019.

(51) Int. Cl.
*H04W 72/23* (2023.01)
*H04W 72/56* (2023.01)

(58) Field of Classification Search
CPC .. H04W 72/21; H04W 72/1273; H04W 72/20
See application file for complete search history.

(56) References Cited

U.S. PATENT DOCUMENTS

| | | | |
|---|---|---|---|
| 11,601,962 B2* | 3/2023 | Baldemair | H04B 7/0413 |
| 2018/0132255 A1 | 5/2018 | Hessler et al. | |
| 2019/0229878 A1 | 7/2019 | Takeda et al. | |
| 2019/0245648 A1* | 8/2019 | Jo | H04W 72/12 |
| 2020/0053661 A1* | 2/2020 | Yang | H04W 52/146 |
| 2020/0259621 A1* | 8/2020 | Oh | H04L 1/1822 |
| 2020/0296701 A1 | 9/2020 | Park et al. | |

OTHER PUBLICATIONS

Ericsson, "PDCCH Enhancements for NR URLLC," Tdoc R1-1904122, Agenda Item: 7.2.6.1, 3GPP TSG-RAN WGI Meeting #96bis, Xi'an, China, Apr. 8-12, 2019, 10 pages.

Ericsson, "PDCCH Enhancements for NR URLLC," Tdoc R1-1906091, Agenda Item: 7.2.6.1, 3GPP TSG-RAN WGI Meeting #97, Reno, Nevada, US, May 13-17, 2019, 11 pages.

3GPP TS 38.133 V15.5.0, "3$^{rd}$ Generation Partnership Project; Technical Specification Group Radio Access Network; NR; Requirements for support of radio resource management (Release 15)," Mar. 2019, 893 pages.

Catt, "Discussion on intra-UE multiplexing scenarios", R1-1900337, Agenda Item: 7.2.6.4, 3GPP TSG RAN WG1 Ad-Hoc Meeting 1901, Taipei, Jan. 21-25, 2019, 9 pages.

Ericsson, "On intra-UE prioritization enablers", Tdoc R1-1904130, Agenda Item: 7.2.6.7, 3GPP TSG RAN WG1 Meeting #96bis, Xian, China, Apr. 8-12, 2019, 10 pages.

Ericsson, "Physical Layer Enhancements for Intra-UE Prioritization and Multiplexing," R1-1901601, 3GPP TSG RAN WG1 Meeting #96, Athens, Greece, Feb. 25-Mar. 1, 2019. (6 pages).

Extended European Search Report, dated Jun. 1, 2022, for European Application No. 20793932.3-1215, 13 pages.

Huawei, HiSilicon, "New WID: Physical Layer Enhancements for NR Ultra-Reliable and Low Latency Communication (URLLC)," RP-190726, Agenda Item: 9.1.1, 3GPP TSG RAN Meeting #83, Shenzhen, China, Mar. 18-21, 2019, 5 pages.

International Search Report, mailed Mar. 17, 2020, for International Application No. PCT/JP2020/002159, 6 pages. (with English Translation).

InterDigital Communications, Inc., "L1/PHY Impacts for Intra-UE prioritization/multiplexing scenarios 6-7," R1-1900768, 3GPP TSG-RAN WG1 Ad-Hoc Meeting 1901, Taipei, Taiwan, Jan. 21-25, 2019. (3 pages).

Nokia, Nokia Shanghai Bell, "New WID: Support of NR Industrial Internet of Things (IoT)," RP-190728, Agenda Item: 9.1.2., 3GPP TSG RAN Meeting #83, Shenzhen, China, Mar. 18-21, 2019, 6 pages.

Panasonic, "Discussion on scheduling/HARQ enhancement for URLLC," R1-1905094, Agenda Item: 7.2.6.4, 3GPP TSG RAN WG1 #96bis, Xi'an, China, Apr. 8-12, 2019, 5 pages.

Panasonic, "Discussion on UCI enhancement for URLLC," R1-1905092, Agenda Item: 7.2.6.2, 3GPP TSG RAN WG1 #96bis, Xi'an, China, Apr. 8-12, 2019, 5 pages.

Samsung, "Corrections to TS 38.213," R1-1903795, 3GPP TSG RAN WG1 Meeting #96, Athens, Greece, Feb. 25-Mar. 1, 2019, 13 pages.

Samsung, "Cross-link interference management based on coordinated beamforming," R1-1700986, Agenda Item: 5.1.7.2, 3GPP TSG RAN WG1 NR Ad-Hoc Meeting, Spokane, USA, Jan. 16-20, 2017, 8 pages.

Samsung, "Discussion on intra-UE multiplexing/prioritization," R1-1901272, Agenda Item: 7.2.6.4, 3GPP TSG RAN WG1 Ad-Hoc Meeting 1901, Taipei, Taiwan, Jan. 21-25, 2019, 6 pages.

Oppo, "Enhancements on multi-TRP and multi-panel transmission," R1-1904036, Agenda Item: 7.2.8.2, 3GPP TSG RAN WGI Meeting #96bis, Xi'an, China, Apr. 8-12, 2019, 10 pages.

Oppo, "Enhancements to scheduling and HARQ," R1-1904045, Agenda Item: 7.2.6.4, 3GPP TSG RAN WG1 #96bis, Xi'an, China, Apr. 8-12, 2019, 3 pages.

Oppo, "UCI enhancements for URLLC," R1-1904043, Agenda Item: 7.2.6.2, 3GPP TSG RAN WG1 #96bis, Xi'an, China, Apr. 8-12, 2019, 6 pages.

* cited by examiner

TERMINAL AND COMMUNICATION METHOD

TECHNICAL FIELD

The present disclosure relates to a terminal and a communication method.

BACKGROUND ART

The specification for Release 15 of New Radio access technology (NR) has been completed for implementing the 5th Generation mobile communication systems (5G) in the 3rd Generation Partnership Project (3GPP). NR supports functions for realizing Ultra Reliable and Low Latency Communication (URLLC) as well as high-speed and large capacity that are basic requirements for enhanced Mobile Broadband (eMBB).

CITATION LIST

Non Patent Literature

NPL 1
RP-190726, "New WID: Physical Layer Enhancements for NR Ultra-Reliable and Low Latency Communication (URLLC)," Huawei, HiSilicon, RAN #83
NPL 2
RP-190728, "New WID: Support of NR Industrial Internet of Things (IoT)," Nokia, Nokia Shanghai Bell, RAN #83
NPL 3
R1-1905092, "Discussion on UCI enhancement for URLLC," Panasonic, RAN1 #96bis, April 2019
NPL 4
R1-1905094, "Discussion on scheduling/HARQ enhancement for URLLC," Panasonic, RAN1 #96bis, April 2019
NPL 5
3GPP TS38.133 V15.5.0, "NR; Requirements for support of radio resource management (Release 15)," March 2019

SUMMARY OF INVENTION

However, there is scope for further study on appropriate radio communication processing according to a requirement.

One non-limiting and exemplary embodiment facilitates providing a terminal, and a communication method each capable of achieving appropriate radio communication processing according to a requirement.

A terminal according to an embodiment of the present disclosure includes: control circuitry, which, in operation, determines a method of determining priority of a first channel and a second channel with resource allocations overlapped with each other in time domain, based on a parameter on control information portions respectively indicating assignment of the first channel and assignment of the second channel; and communication circuitry, which, in operation, transmits or receives a signal for at least one of the first channel and/or the second channel based on the priority.

It should be noted that general or specific embodiments may be implemented as a system, an apparatus, a method, an integrated circuit, a computer program, a storage medium, or any selective combination thereof.

According to an embodiment of the present disclosure, it is possible to realize appropriate radio communication processing according to a requirement.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the accompanying drawings.

In NR, a terminal (also referred to as User Equipment (UE)) is assumed to support a plurality of services (e.g., eMBB and URLLC) with different requirements. For such a terminal, the reception resources (i.e., downlink resources or reception periods) or the transmission resources (i.e., uplink resources or transmission periods) for respective services with different requirements possibly overlap with each other in time domain (see, for example, Non Patent Literatures (hereinafter, referred to as NPLs) 1 and 2).

The following describes each of the cases (e.g., also referred to as scenarios) where the transmission/reception resources for the services with different requirements overlap with each other for the terminal in the time domain.

<Scenario 1: Intra-UE DL Prioritization (DL Data/Data Resource Conflicts)>

Figure 1:
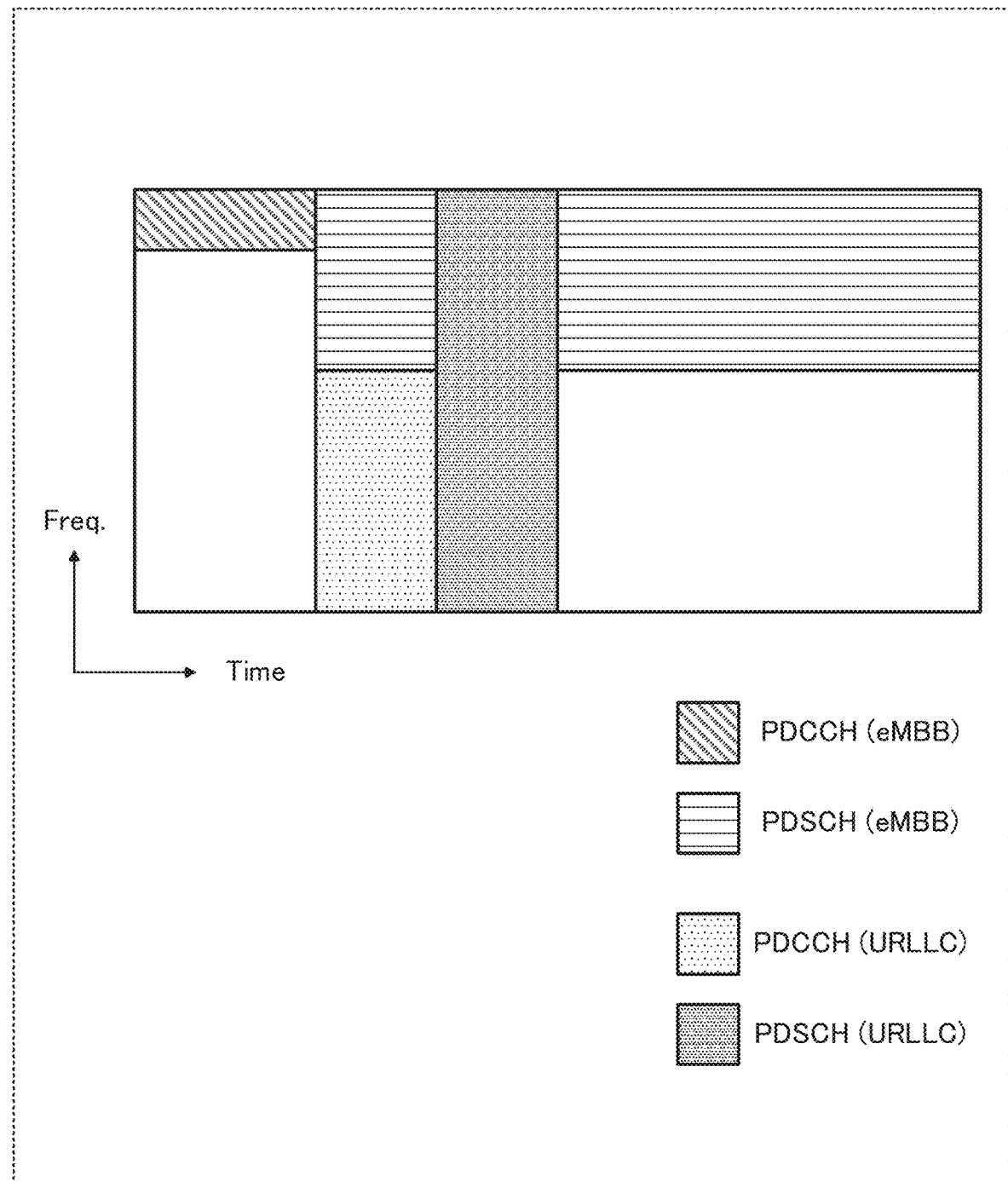
FIG. 1 illustrates an exemplary case (Scenario 1) where resources for services with different requirements overlap with each other in time domain.

In Scenario 1, as illustrated in FIG. 1, for example, a terminal receives data signals (e.g., downlink data signals or Physical Downlink Shared Channels (PDSCHs)) for services (eMBB and URLLC in FIG. 1) with different requirements in downlink.

At this time, resources are allocated to the downlink data signals for the respective services by different control information portions (e.g., also referred to as downlink scheduling allocation information portions or DL assignment). The DL assignment may be included in a downlink control channel (e.g., Physical Downlink Control Channel (PDCCH)) as illustrated in FIG. 1, for example.

In FIG. 1, the resources (e.g., PDSCH resources) allocated to the downlink data signals for the respective services overlap with each other in the time domain.

<Scenario 2: Intra-UE UL Prioritization (UL Data/Data Resource Collision)>

Figure 2:
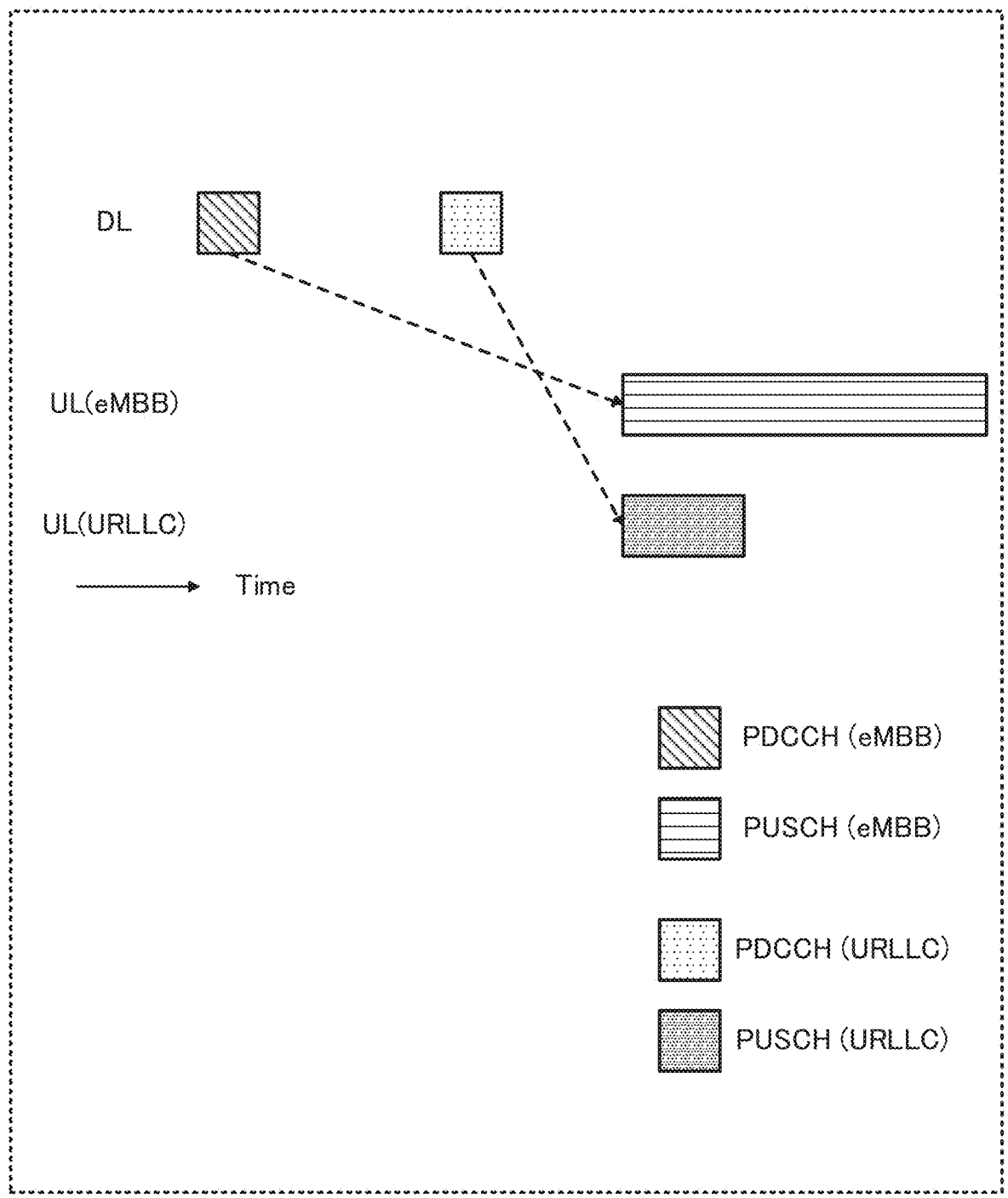
FIG. 2 illustrates another exemplary case (Scenario 2) where resources for the services with different requirements overlap with each other in the time domain.

In Scenario 2, as illustrated in FIG. 2, for example, a terminal transmits data signals (e.g., uplink data signals, or Physical Uplink Shared Channels (PUSCHs)) for the services (eMBB and URLLC in FIG. 2) with different requirements in uplink.

At this time, resources are allocated to the uplink data signals for the respective services by different control information portions (e.g., also referred to as uplink resource allocation information portions or UL grant). The UL grant may be included in PDCCHs as illustrated in FIG. 2, for example.

In FIG. 2, the resources (e.g., PUSCH resources) allocated to the uplink data signals for the respective services overlap with each other in the time domain.

<Scenario 3: Intra-UE UL Prioritization (UL Control/Control Resource Collision)>

In Scenario 3, a terminal transmits a response signal (e.g., Acknowledgement/Negative Acknowledgement (ACK/NACK)) indicating a result of error detection for a downlink data signal (e.g., PDSCH) to a base station (e.g., also referred to as gNB) in downlink retransmission control (e.g., Hybrid Automatic Repeat Request (HARQ)).

Figure 3:
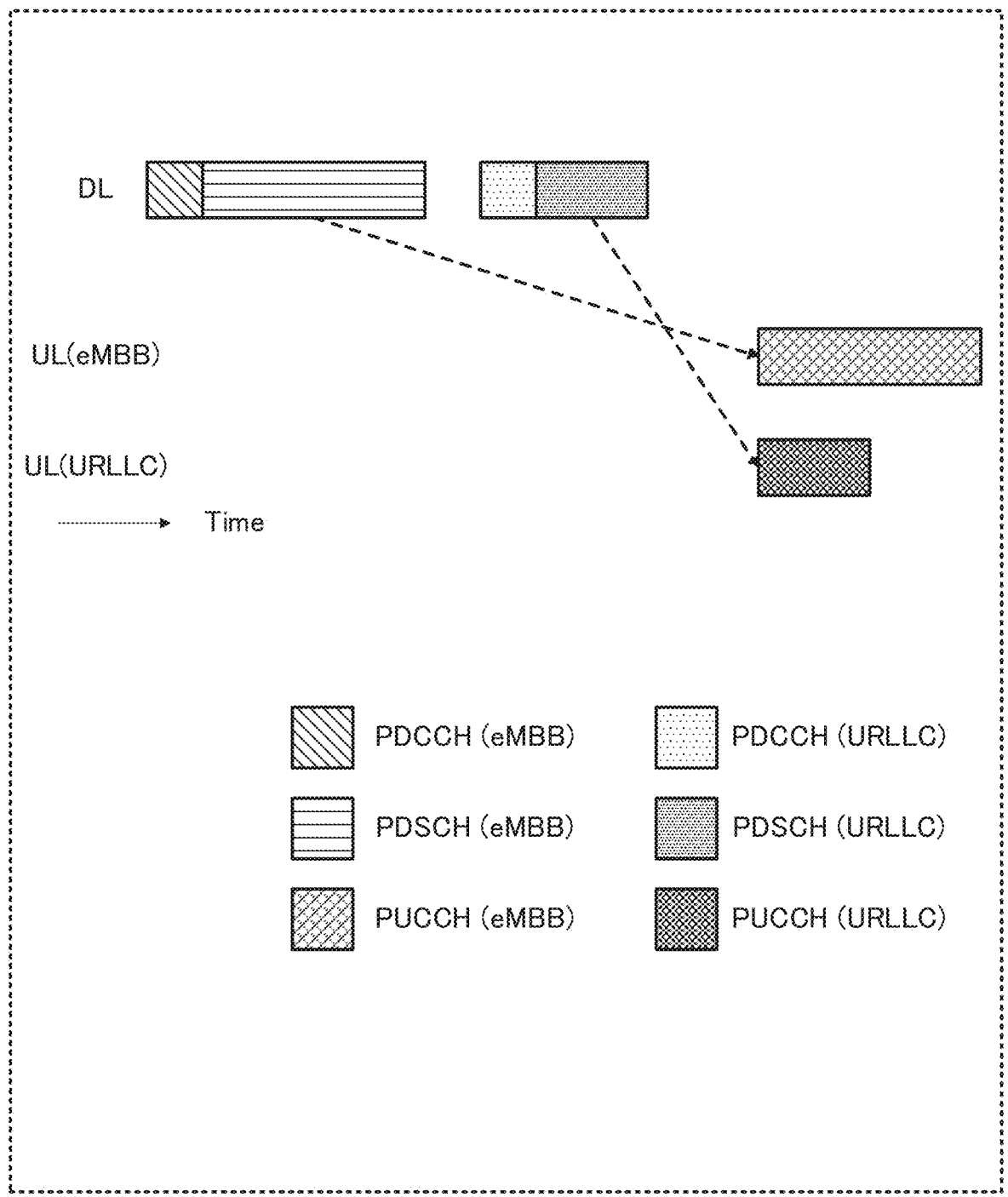
FIG. 3 illustrates still another exemplary case (Scenario 3) where resources for the services with different requirements overlap with each other in the time domain.

As illustrated in FIG. 3, for example, the terminal receives data signals (e.g., PDSCHs) for respective services (eMBB and URLLC in FIG. 3) with different requirements in downlink. The terminal also transmits ACK/NACK for each PDSCH to the base station using uplink control channels (e.g., Physical Uplink Control Channels (PUCCHs)).

At this time, resources are allocated to the downlink data signals for the respective services and the PUCCHs corresponding to the downlink data signals by different control information portions (e.g., downlink scheduling allocation information portions or DL assignment).

In FIG. 3, the resources allocated to the PUCCHs for the respective services overlap with each other in the time domain.

<Scenario 4: Intra-UE UL Prioritization (UL Data/Control Resource Collision)>

Figure 4:
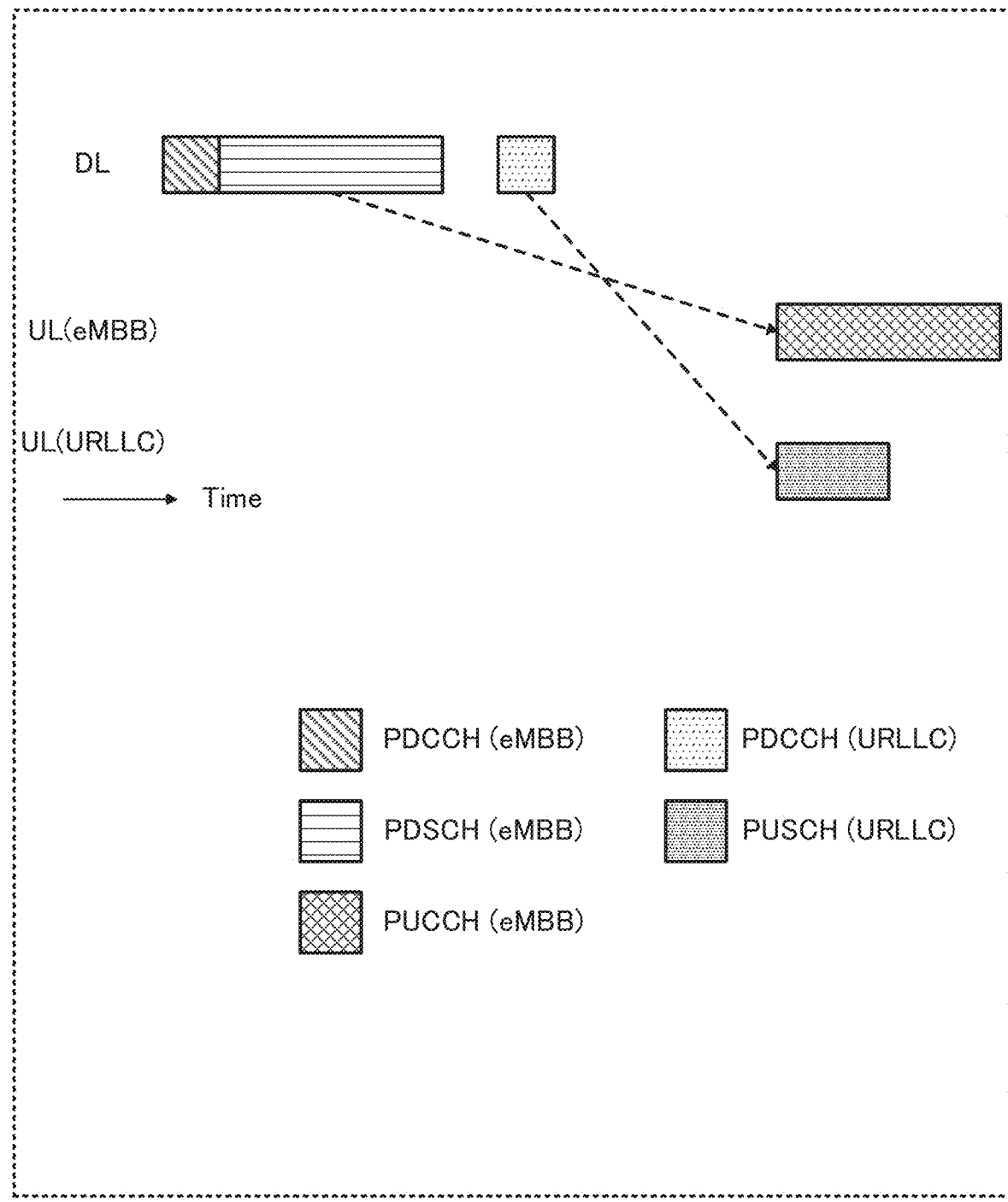
FIG. 4 illustrates still another exemplary case (Scenario 4) where resources for the services with different requirements overlap with each other in the time domain.

In Scenario 4, as illustrated in FIG. 4, for example, a terminal transmits a data signal (e.g., PUSCH) for one (e.g., URLLC) of the services (eMBB and URLLC in FIG. 4) with different requirements and a control signal (e.g., ACK/NACK for PDSCH) for the other (e.g., eMBB) in uplink.

At this time, a resource is allocated to the uplink data signal by uplink resource allocation information (e.g., UL grant). Meanwhile, resources are allocated to the downlink data signal and the PUCCH corresponding to the downlink data signal by different downlink scheduling allocation information portions (e.g., DL assignment).

In FIG. 4, the resource allocated to the uplink data signal (e.g., PUSCH resource) and the resource allocated to the PUCCH overlap with each other in the time domain.

Scenarios 1 to 4 have been described, thus far.

In the scenarios described above, in a case where the terminal is capable of simultaneously receiving or transmitting signals in a plurality of channels, the terminal can simultaneously receive or transmit the signals for the services with different requirements without taking into account the effect on each other.

In a case where the terminal is not capable of simultaneously receiving or transmitting signals in a plurality of channels, however, the terminal receives or transmits some of the plurality of channels (one or the other in the cases of the scenarios described above). Alternatively, the terminal controls the transmit power for the plurality of channels when the channels are uplink channels.

In a case where the terminal cannot simultaneously receive or transmit signals in a plurality of channels, the terminal determines which signal in a channel to receive or transmit. In other words, the terminal possibly determines priority of reception or transmission of signals in the plurality of channels.

An exemplary method of determining the priority of the channels is, for example, a method based on the reception timing (i.e., reception order) of Downlink Control Information (DCI) including the DL assignment or the UL grant in the terminal.

In this method, when the terminal sequentially receives the DCIs including assignment information (e.g., DL assignment or UL grant) for respective channels (i.e., respective services), for example, the terminal determines that the channel assigned by the DCI received later takes priority over the channel assigned by the DCI received earlier.

The reason is as follows: in a case where high priority is given to the channel assigned by the DCI (DL assignment or UL grant) that is earlier transmitted by a base station, it is unreasonable to later assign a low-priority channel to a resource of the high-priority channel.

The above-mentioned priority determination method, however, has scope for further study on the following issues 1, 2 and 3, for example.

1. In Scenario 4 (see, for example, FIG. 4), for example, the processing time for a terminal to generate the PUSCH (PUSCH for URLLC in FIG. 4) is different from the processing time for the terminal to receive the PDSCH (PDSCH for eMBB in FIG. 4), demodulate and decode the PDSCH, and generate the PUCCH including ACK/NACK.

This possibly causes a base station to fail to transmit the DCI corresponding to the high-priority channel (e.g., URLLC channel) after the DCI corresponding to the low-priority channel (e.g., eMBB channel) when the resources for the PUSCH and the PUCCH overlap with each other in the time domain, as in Scenario 4. The terminal thus possibly receives the DCI corresponding to the high-priority channel before the DCI corresponding to the low-priority channel, for example, and thereby the terminal cannot always determine the priority of the channels properly in the method of determining the priority of the channels based on the reception order of the DCIs.

Figure 5:
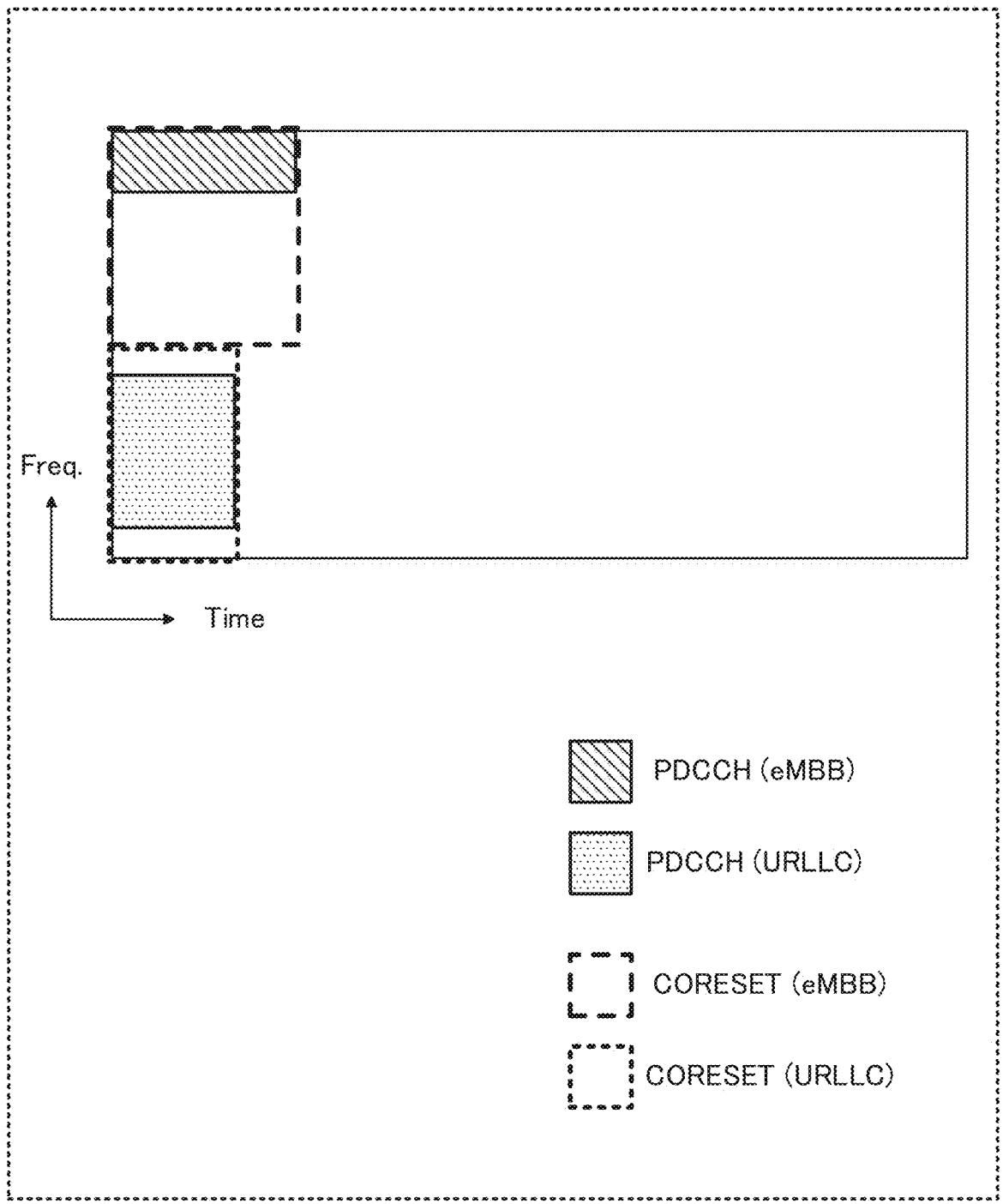
FIG. 5 illustrates an example where CORESETs are configured to be overlapped with each other in the time domain.

2. In NR, a terminal receives a DCI including at least one of the DL assignment and the UL grant from a base station. A Control Resource Set (CORESET) and search spaces, for example, are configured to the terminal for the PDCCH, which is a control channel where the DCI is transmitted. For example, the terminal monitors (i.e., blind-decodes) the search spaces, which are positions of PDCCH candidates in the CORESET, and detects the DCI addressed to the terminal. At this time, different CORESETs (or different search spaces) are possibly configured to the terminal for the services with different requirements. Further, as illustrated in FIG. 5, at least parts of CORESETs configured for the respective services (eMBB and URLLC in FIG. 5) with different requirements are possibly configured to be overlapped with each other in the time domain, for example.

In this case, the terminal sometimes cannot determine which DCI is the DCI received later (i.e., which service takes priority) when receiving the DCIs corresponding to the respective services from the CORESETs. In other words, it is possible to fail to determine the priority between the services (or channels) with different requirements in the case of FIG. 5 (the priority determination method is unclear).

Figure 6:
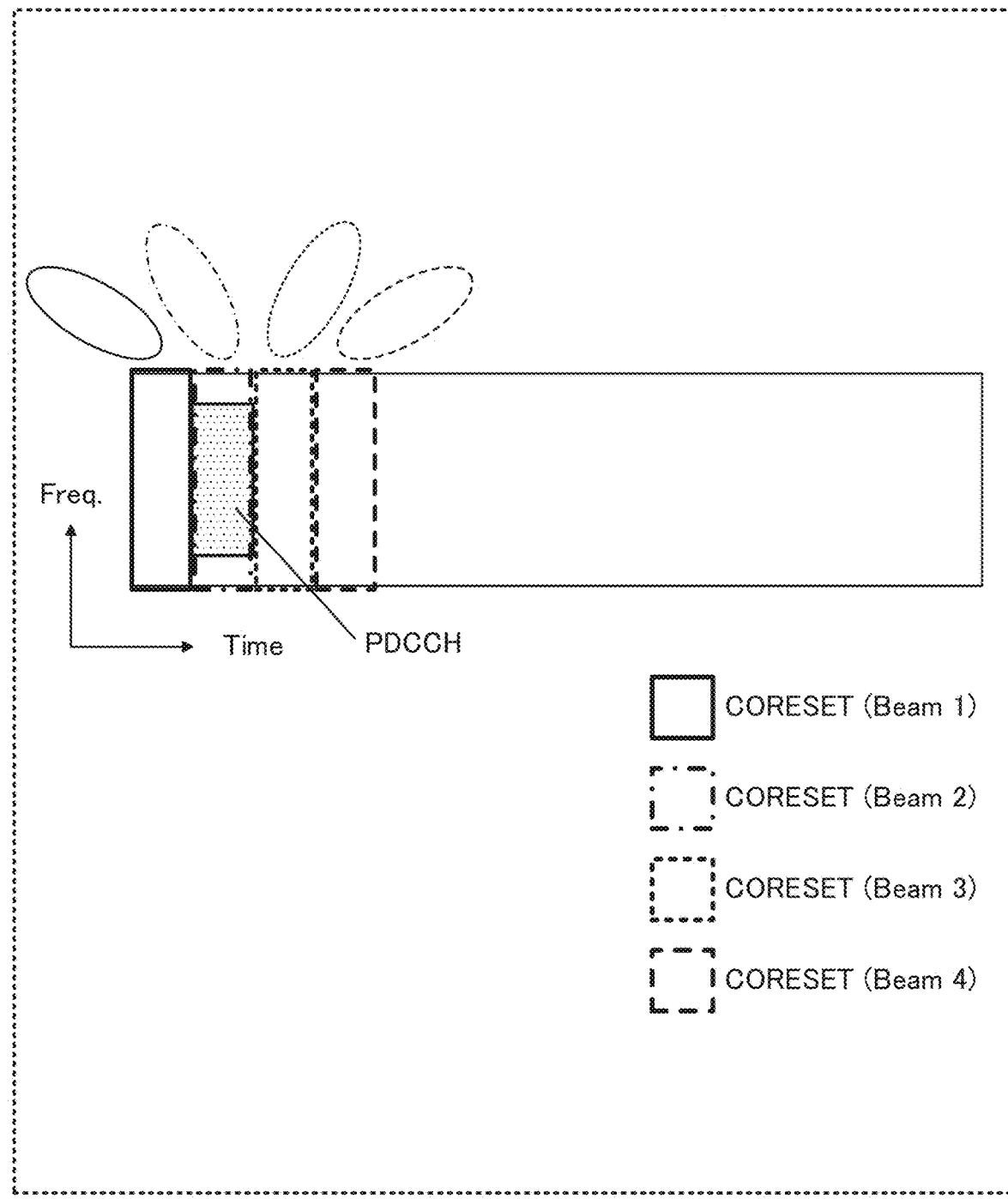
FIG. 6 illustrates an exemplary application of transmission beamforming.

3. In NR, transmission beamforming is assumed to be applied in a base station, for example, in a high frequency band equal to or higher than 6 GHz. The application of the transmission beamforming secures a communicable range and area between the base station and a terminal. For example, there is a configuration in which the base station sequentially switches beams in a slot to transmit the PDCCH (e.g., also referred to as beam sweeping). When the beamforming is applied to the PDCCH, a CORESET (or search space) is possibly configured for each beam (each of four beams in FIG. 6), for example, as illustrated in FIG. 6.

In this case, the CORESET (i.e., search space or PDCCH) to which the DCI is assigned is preferably a CORESET corresponding to an appropriate beam for the terminal. For example, as illustrated in FIG. 6, a resource configured with the CORESET corresponding to the appropriate beam for the terminal is allocated to the terminal among a plurality of resources respectively configured with CORESETs each corresponding to the beam in the time domain. This limits scheduling of the DCI in the time domain. Thus, when the beamforming is applied, the above-described method of determining the priority based on the order of the DCI possibly increases a delay due to the scheduling restriction.

Issues 1 to 3 have been each described, thus far.

As another example of the method of determining the priority of channels, NPLs 3 and 4 disclose a method of indicating, from a base station to a terminal, information indicating the priority of channels (also referred to as priority information or a priority indication in the following), for example. The priority indication is indicated, for example, by the DL assignment or the UL grant.

In NPLs 3 and 4, the terminal determines which channel of the PUSCH or the PUCCH is prioritized based on the priority indication included in each of the UL grant and the DL assignment, for example, in the case of Scenario 4 where the resources for the PUSCH and the PUCCH overlap with each other in the time domain (see, for example, FIG. 4).

Additionally, in Scenarios 1, 2 and 3 (see, for example, FIGS. 1, 2 and 3), the terminal sequentially receives the DCIs (including the DL assignment or the UL grant, for example) and determines that the channel assigned by the DCI received later takes priority among the plurality of DCIs, for example, in NPLs 3 and 4. Further, when the DCIs include the priority indications, for example, the terminal does not assume that the channel assigned by the DCI received later is configured to have lower priority than the channel assigned by the DCI received earlier, among the plurality of DCIs.

These methods allow the terminal to determine the priority between the channels properly by the priority indications even when the channels transmitted or received by the terminal overlap with each other in the time domain, for example. In this method, however, the above-described issues 2 and 3 are not considered. For example, there is scope for further study on a method of determining the channel priority in the case where the resource areas (e.g., CORESETs, search spaces, or PDCCHs) overlap with each other in the time domain, as in the above-described issue 2. The resource areas include control information (e.g., DL assignment and UL grant) indicating the assignment of each of the channels that overlap with each other in the time domain. There is also scope for further study on a method of determining the channel priority in the case where a resource area (e.g., CORESET, search space, or PDCCH) including control information indicating the assignment of at least one of the channels overlapped with each other in the time domain is, for example, one of the resource areas respectively configured with a plurality of beams, as in the above-described issue 3.

With this regard, an embodiment of the present disclosure will provide a description of the operation of the terminal when the channels corresponding to the services with different requirements overlap with each other in the time domain.

Hereinafter, embodiments will be each described in detail.

Embodiment 1

Overview of Communication System

A communication system according to the embodiments of the present disclosure includes base station 100 and terminal 200.

Figure 7:
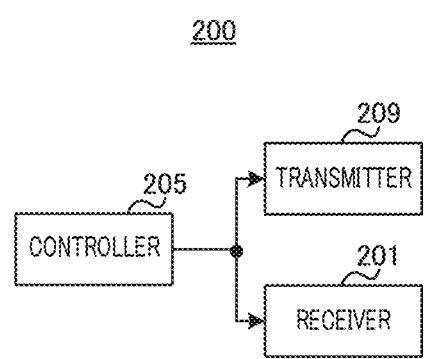
FIG. 7 is a block diagram illustrating an exemplary configuration of a part of a terminal according to Embodiment 1.

FIG. 7 is a block diagram illustrating an exemplary configuration of a part of terminal 200 according to an embodiment of the present disclosure. In terminal 200 illustrated in FIG. 7, controller 205 (e.g., corresponding to control circuitry) determines a method of determining the priority of the first channel and the second channel with resource allocations overlapped with each other in the time domain, based on a parameter on control information portions (e.g., DCIs) respectively indicating the assignment of the first channel and the assignment of the second channel. Receiver 201 and transmitter 209 (e.g., corresponding to communication circuitry) receive or transmit a signal for at least one of the first channel and the second channel based on the priority.

Configuration of Base Station

Figure 8:
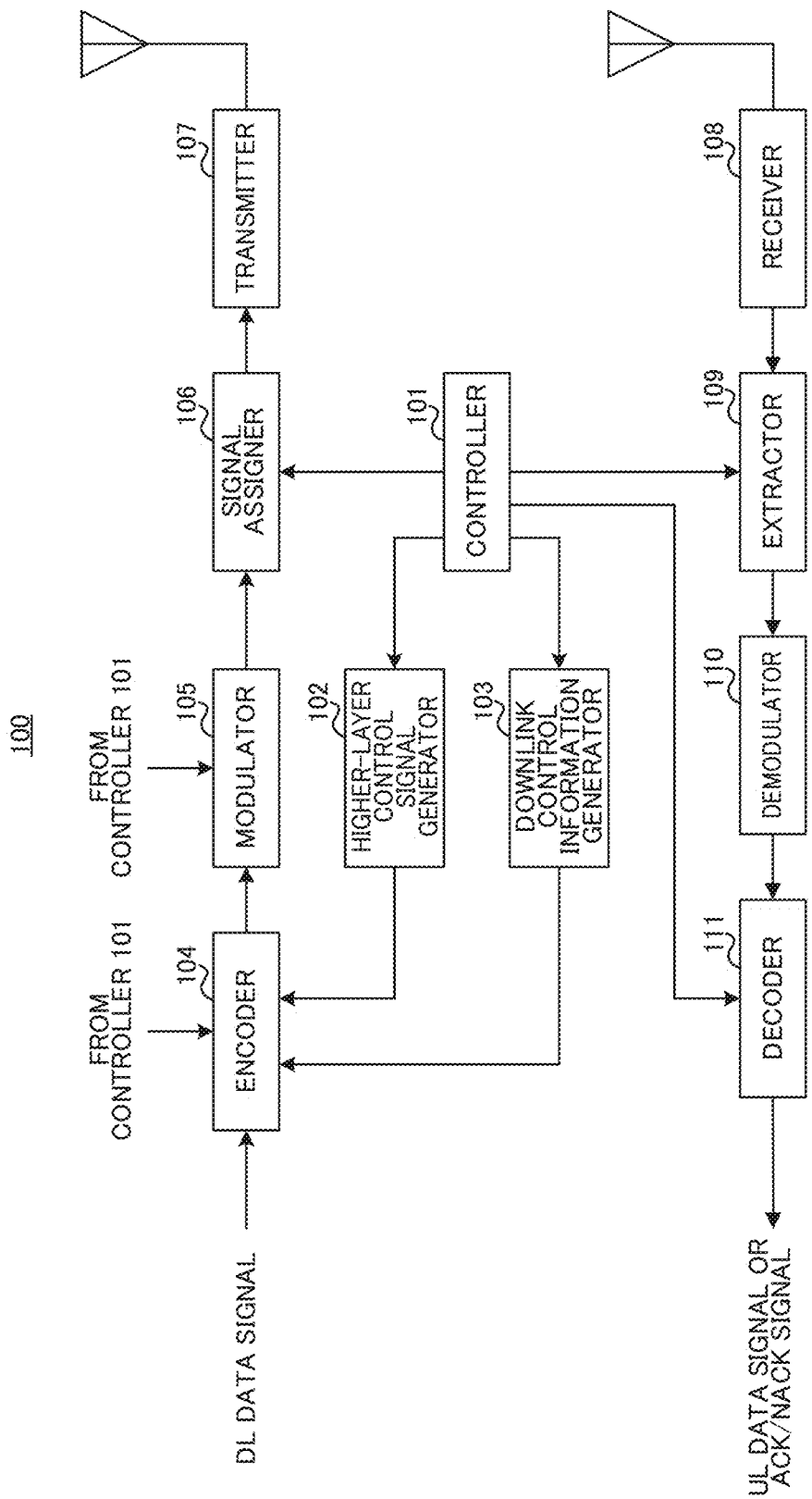
FIG. 8 is a block diagram illustrating an exemplary configuration of a base station according to Embodiment 1.

FIG. 8 is a block diagram illustrating an exemplary configuration of base station 100 according to Embodiment 1. In FIG. 8, base station 100 includes controller 101, higher-layer control signal generator 102, downlink control information generator 103, encoder 104, modulator 105, signal assigner 106, transmitter 107, receiver 108, extractor 109, demodulator 110, and decoder 111.

Controller 101 determines information for terminal 200 to receive a DCI, and outputs the determined information to higher-layer control signal generator 102 and extractor 109, for example. The information for receiving a DCI may include, for example, information on a CORESET, a search space configuration, and a DCI field.

Controller 101 also determines information (e.g., Modulation and Coding Scheme (MCS) and radio resource allocation) on a downlink signal for transmitting a downlink data signal (e.g., PDSCH), a higher-layer control signal, or downlink control information (e.g., DCI). Controller 101 outputs the determined information to encoder 104, modulator 105, and signal assigner 106, for example. Controller 101 also outputs the information on a downlink signal to downlink control information generator 103.

In addition, controller 101 determines information for terminal 200 to transmit ACK/NACK for the downlink data signal, and outputs the determined information to downlink control information generator 103 and extractor 109. The information for transmitting ACK/NACK may include, for example, information on a PUCCH resource.

Further, controller 101 determines information (e.g., modulation and coding scheme and radio resource allocation) for terminal 200 to transmit an uplink data signal, and outputs the determined information to downlink control information generator 103, extractor 109, and decoder 111.

When the priority indication is applied, controller 101 determines the priority of a plurality of channels (e.g., PDSCHs, PUSCHs or PUCCHs), and outputs the determined priority information (e.g., priority indication) to downlink control information generator 103. Controller 101 also outputs the determined priority information to extractor 109.

Higher-layer control signal generator 102 generates a higher-layer control signal bit string based on the information inputted from controller 101, and outputs the higher-layer control signal bit string to encoder 104.

Downlink control information generator 103 generates a downlink control information (e.g., DCI) bit string based on the information inputted from controller 101, and outputs the generated DCI bit string to encoder 104. Note that control information is sometimes transmitted to a plurality of terminals. Thus, downlink control information generator 103 may scramble the DCI on a PDCCH to be transmitted by UE specific identification information. The UE specific identification information may be, for example, a Cell Radio Network Temporary Identifier (C-RNTI), a Modulation and Coding Scheme C-RNTI (MCS-C-RNTI), and an RNTI introduced for URLLC, or may be another RNTI.

Encoder 104 encodes the downlink data signal, the bit string inputted from higher-layer control signal generator 102, or the DCI bit string inputted from downlink control information generator 103, for example, based on the information (e.g., information on a coding rate) inputted from controller 101, and outputs the encoded bit string to modulator 105.

Modulator 105 modulates the encoded bit string inputted from encoder 104, for example, based on the information (e.g., information on a modulation scheme) inputted from controller 101, and outputs the modulated signal (e.g., a symbol string) to signal assigner 106.

Signal assigner 106 maps the symbol string (including the downlink data signal or a control signal, for example) inputted from modulator 105 to a radio resource based on the information indicating the radio resource inputted from controller 101. Signal assigner 106 outputs a downlink signal with the signal mapped to transmitter 107.

Transmitter 107 performs, for example, transmission waveform generation processing, such as Orthogonal Frequency Division Multiplexing (OFDM), on the signal inputted from signal assigner 106. Transmitter 107 also performs Inverse Fast Fourier Transform (IFFT) processing on the signal in a case of OFDM transmission adding a CP, and adds the CP to the signal after the IFFT. Further, transmitter 107 performs RF processing, such as D/A conversion and up-conversion, on the signal, and transmits the radio signal to terminal 200 via an antenna.

Receiver 108 performs RF processing, such as down-conversion or A/D conversion, on an uplink signal received from terminal 200 through the antenna. In a case of the OFDM transmission, receiver 108 performs Fast Fourier Transform (FFT) processing on the received signal, and outputs the obtained frequency-domain signal to extractor 109.

Extractor 109 determines information on a channel where the signal has been transmitted by terminal 200 (e.g., information on a higher-priority channel) based on the information inputted from controller 101. Extractor 109 extracts, from the received signal inputted from receiver 108, a radio resource portion where the uplink data signal, the ACK/NACK signal, or both have been transmitted, for example, based on the determined information, and outputs the extracted radio resource portion to demodulator 110.

Demodulator 110 demodulates at least one of the uplink data signal and the ACK/NACK signal based on the signal (radio resource portion) inputted from extractor 109, and outputs the demodulation result to decoder 111.

Decoder 111 performs error correction decoding on at least one of the uplink data signal and the ACK/NACK signal based on the information inputted from controller 101 and the demodulation result inputted from demodulator 110, and obtains a decoded reception bit sequence.

Configuration of Terminal

Figure 9:
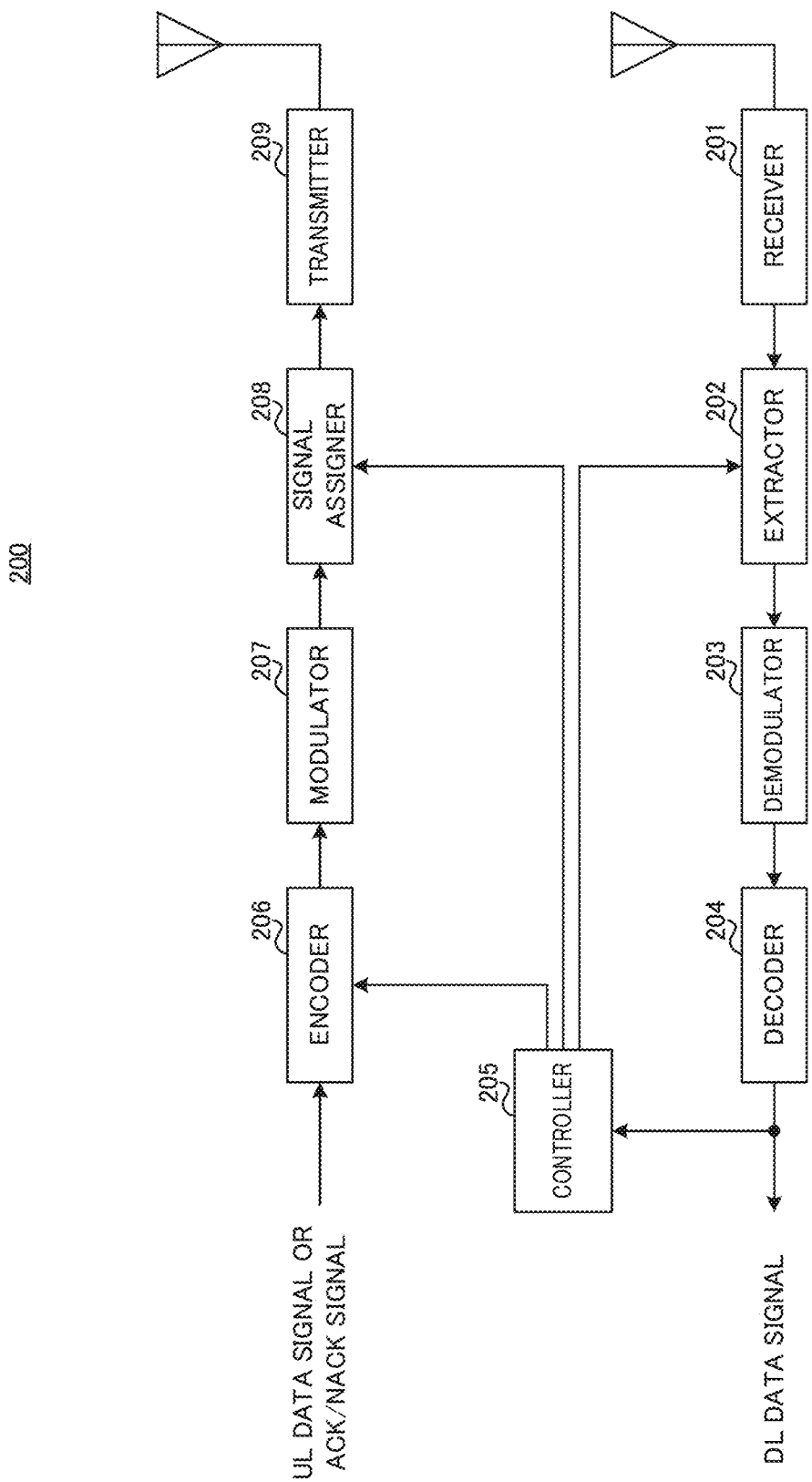
FIG. 9 is a block diagram illustrating an exemplary configuration of the terminal according to Embodiment 1.

FIG. 9 is a block diagram illustrating an exemplary configuration of terminal 200 according to the present embodiment. In FIG. 9, terminal 200 includes receiver 201, extractor 202, demodulator 203, decoder 204, controller 205, encoder 206, modulator 207, signal assigner 208, and transmitter 209.

Receiver 201 receives a downlink signal (e.g., downlink data signal or downlink control information) from base station 100 via an antenna, performs RF processing, such as down-conversion or A/D conversion, on the received radio signal, and obtains a received signal (baseband signal). Receiver 201 also performs FFT processing on a received signal when receiving an OFDM signal, and converts the received signal into a frequency domain signal. Receiver 201 outputs the received signal to extractor 202.

Extractor 202 extracts a radio resource portion possibly including downlink control information from the received signal inputted from receiver 201, based on the information on a radio resource for the downlink control information inputted from controller 205, and outputs the extracted radio resource portion to demodulator 203. Extractor 202 also extracts a radio resource portion including a downlink data signal based on the information on a radio resource for the data signal inputted from controller 205, and outputs the extracted radio resource portion to demodulator 203.

Further, extractor 202 extracts a downlink data signal from the received signal based on the information on the priority inputted from controller 205, for example, in the case of Scenario 1 (in other words, when receiving downlink data signals; see FIG. 1, for example).

Demodulator 203 demodulates the signal inputted from extractor 202, and outputs the demodulation result to decoder 204.

Decoder 204 performs error correction decoding on the demodulation result inputted from demodulator 203, and obtains, for example, downlink reception data, a higher-layer control signal, or downlink control information.

Decoder 204 outputs the higher-layer control signal and the downlink control information to controller 205, and outputs the downlink reception data.

Controller 205 determines the priority of channels based on, for example, information for receiving the DCI (e.g., information on CORESET, search space configuration, or DCI field) included in the higher-layer control signal inputted from decoder 204 and radio resource allocation information indicated in the downlink control information. Controller 205 outputs information on the determined priority to extractor 202 (e.g., in the case of Scenario 1), and to encoder 206 and the signal assigner (e.g., in the case of Scenarios 2, 3, and 4). Note that exemplary methods of determining the channel priority will be described later.

Controller 205 also determines information on uplink signal transmission, and outputs the determined information to encoder 206 and signal assigner 208. In addition, controller 205 determines information on downlink signal reception, and outputs the determined information to extractor 202.

Encoder 206 encodes the uplink data signal or the ACK/NACK signal for the downlink data signal based on the information inputted from controller 205, and outputs the encoded bit string to modulator 207.

Modulator 207 modulates the encoded bit string inputted from encoder 206, and outputs the modulated signal (symbol string) to signal assigner 208.

Signal assigner 208 maps the signal inputted from modulator 207 to a radio resource based on the information inputted from controller 205, and outputs the uplink signal with the signal mapped to transmitter 209.

In the case of Scenarios 2, 3 and 4 (in other words, when transmitting uplink signals; see, for example, FIG. 2, 3, or 4), for example, signal assigner 208 determines an uplink channel to be outputted to transmitter 209 for the uplink signal, based on the information on the priority inputted from controller 205.

Transmitter 209 performs transmission signal waveform generation, such as OFDM, on the signal inputted from signal assigner 208. Transmitter 209 also performs IFFT processing on the signal in a case of OFDM transmission using a CP, and adds the CP to the signal after the IFFT. Alternatively, a Discrete Fourier Transformer (DFT) may be added (not illustrated) to the stage after modulator 207 or before signal assigner 208 in a case where transmitter 209 generates a single-carrier waveform. Further, transmitter 209 performs RF processing, such as D/A conversion and up-conversion, on the transmission signal, and transmits the radio signal to base station 100 via the antenna.

Exemplary Operations of Base Station 100 and Terminal 200

Exemplary operations of base station 100 and terminal 200 that have the above-described configurations will be described.

Figure 10:
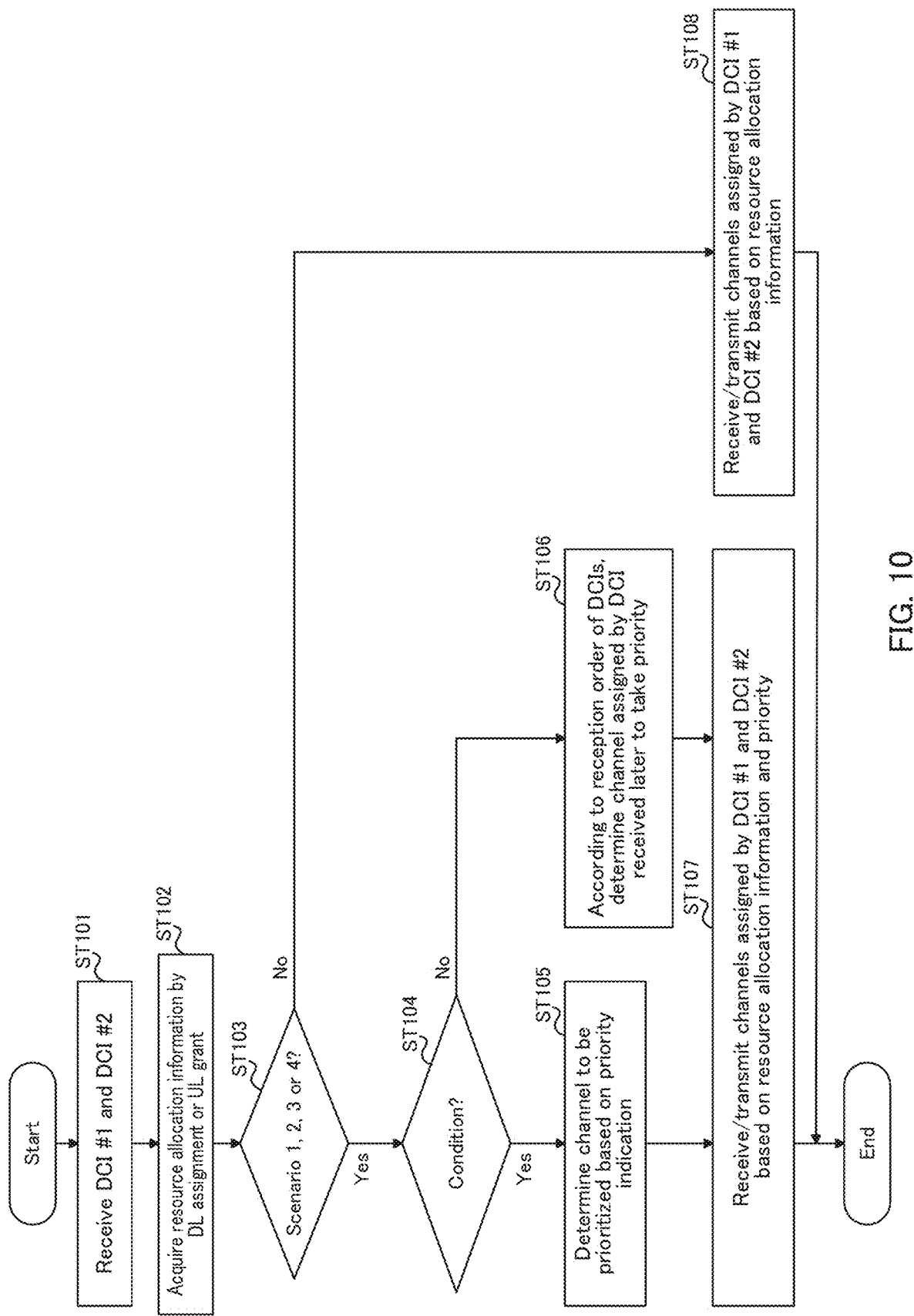
FIG. 10 is a flowchart describing an exemplary operation of the terminal according to Embodiment 1.

FIG. 10 is an exemplary procedure of transmission/reception processing in terminal 200 according to the present embodiment.

In FIG. 10, terminal 200 receives DCIs including DL assignment or UL grant from base station 100 (ST101). By way of example, terminal 200 receives DCI #1 and DCI #2 respectively corresponding to services with different requirements, in FIG. 10.

A CORESET and search spaces, for example, are configured to terminal 200 for a PDCCH, which is a control channel where the DCI is transmitted. Terminal 200 monitors the search spaces, which are positions of PDCCH candidates in the CORESET, for example, and detects a DCI addressed to terminal 200. Different CORESETs (or search spaces) are possibly configured for the services with different requirements. Further, as illustrated in FIG. 5, for example, the CORESETs respectively corresponding to the services with different requirements are possibly configured to be overlapped with each other in the time domain. Thus, terminal 200 detects DCI #1 and DCI #2 in the different CORESETs (or search spaces) respectively, for example.

Terminal 200 acquires resource allocation information indicating a resource for a channel allocated to terminal 200 based on the DL assignment or the UL grant included in each of the detected DCI #1 and DCI #2 (ST102).

Terminal 200 determines, based on the acquired resource allocation information, whether any of the above-described Scenarios 1, 2, 3 and 4 is applied to, for example, the relationships among the allocated resources for the channels (e.g., PDSCHs, PUSCHs or PUCCHs) respectively corresponding to the services with different requirements (ST103). In other words, terminal 200 determines whether the allocated resources for the channels respectively corresponding to the services with different requirements overlap with each other in the time domain.

When any of Scenarios 1, 2, 3 and 4 is applied (Yes in ST103), terminal 200 determines whether a certain condition is satisfied (ST104).

The condition in Embodiment 1 (hereinafter, referred to as "Condition A") is that resource areas (e.g., CORESETs, search spaces, or PDCCHs; the following description is based on the CORESETs as an example) respectively including DCI #1 and DCI #2 received (i.e., detected) by terminal 200 are configured to be overlapped with each other in the time domain.

When Condition A is satisfied, that is, when the CORESETs respectively including DCI #1 and DCI #2 are configured to be overlapped with each other in the time domain (Yes in ST104), terminal 200 determines a channel where transmission or reception is to be prioritized (i.e., channel priority) based on the priority information (priority indication) included in each DCI (ST105). In other words, terminal 200 does not determine the channel priority based on the reception (or detection) timings (or order) of DCI #1 and DCI #2 when Condition A is satisfied. For example, terminal 200 may determine that the DCIs are received at the same timing when Condition A is satisfied.

As described above, terminal 200 selects the determination method of determining the channel priority according to the priority indications when the CORESETs respectively including DCI #1 and DCI #2 overlap with each other in the time domain. Herein, the priority indicated by one bit of a DCI (e.g., 0 or 1) may be configured as the priority indication, by way of example.

For example, "1" may indicate higher priority and "0" may indicate lower priority in the priority indication. When the priority indication of DCI #1 is 1 and the priority indication of DCI #2 is 0 in DCI #1 and DCI #2 respectively corresponding to the services with different requirements, for example, terminal 200 determines that the channel assigned by DCI #1 takes priority over the channel assigned by DCI #2. Meanwhile, when the priority indication of DCI #1 is 0 and the priority indication of DCI #2 is 1, terminal 200 determines that the channel assigned by DCI #2 takes priority over than the channel assigned by DCI #1.

Note that the priority indication is not limited to be indicated by one bit, and may be indicated by a plurality of bits. In addition, the association between the priority indication value (e.g., 0 and 1) and the priority is not limited to the example described above. The exemplary priority indication described above can also be applied to another embodiment.

When Condition A is not satisfied in FIG. 10, e.g., when the CORESETs respectively including DCI #1 and DCI #2 are not configured to be overlapped with each other in the time domain (No in ST104), terminal 200 determines the channel priority based on the reception (or detection) order of DCI #1 and DCI #2 (ST106). For example, terminal 200 determines that the channel assigned by the DCI received later among DCI #1 and DCI #2 takes priority over the channel assigned by the other DCI received earlier.

As described above, terminal 200 selects the determination method of determining the channel priority according to the reception order of the DCIs when the CORESETs respectively including DCI #1 and DCI #2 do not overlap with each other in the time domain.

Terminal 200 receives or transmits a signal in the channel assigned by at least one of DCI #1 and DCI #2 based on the resource allocation information of each channel and the determined priority of each channel (ST107).

Meanwhile, when none of Scenarios 1, 2, 3, and 4 is applied in the process of ST103 (No in ST103), that is, when the allocated resources for the channels respectively corresponding to the services with different requirements do not overlap with each other in the time domain, terminal 200 receives or transmits signals in the channels assigned by DCI #1 and DCI #2 based on the resource allocation information of each channel (ST108).

As described above, in the present embodiment, terminal 200 determines the method of determining the priority of the channels (e.g., the first channel corresponding to URLLC and the second channel corresponding to eMBB) with resource allocations overlapped with each other in the time domain, based on the information (i.e., parameter on control information) indicating the resources, such as the CORESETs, the search spaces, and the PDCCHs, corresponding to the DCIs respectively indicating the assignment of the first channel and the assignment of the second channel.

In the present embodiment, for example, terminal 200 selects one of the two priority determination methods (e.g., the first determination method and the second determination method) based on whether the CORESETs respectively corresponding to the DCIs corresponding to the respective services with different requirements overlap with each other in the time domain. The first determination method is based on the priority indication, and the second determination method is based on the reception order of the DCIs.

This allows terminal 200 to appropriately determine the channel priority based on the reception order of the DCIs when the CORESETs respectively including the plurality of DCIs are not configured to be overlapped with each other in the time domain. In other words, terminal 200 can more easily determine the channel priority without an indication of the priority indication, for example.

In addition, terminal 200 can clearly determine the channel to be prioritized based on the priority indication even when the CORESETs respectively including the plurality of DCIs are configured to be overlapped with each other in the time domain, e.g., when the DCIs are received at the same timing.

Thus, the present embodiment enables terminal 200 to appropriately determine the channel priority, and transmit and receive signals of the channels according to the priority, even when the channels respectively corresponding to the services with different requirements overlap with each other in the time domain and the CORESETs (search spaces or PDCCHs) each including the control information indicating the assignment of each of the channels overlapped in the time domain overlap with each other in the time domain. Consequently, the present embodiment realizes appropriate radio communication processing according to the requirements.

Note that, in Embodiment 1, terminal 200 determines the channel to be prioritized based on the priority indications indicated by the DCIs in the case where the CORESETs (search spaces or PDCCHs) respectively including the DCIs are configured to be overlapped with each other in the time domain when terminal 200 receives (or detects) the DCIs. Incidentally, the control information to be indicated by the DCI, for example, can be flexibly configured in a DCI introduced for URLLC. Thus, the DCI introduced for URLLC can be configured with or without the priority indication, for example.

With this regard, base station 100 may include the priority indication in the DCI and transmit the DCI, for example, when the CORESETs (search spaces or PDCCHs) are configured to be overlapped with each other in the time domain. In other words, base station 100 includes no priority indication in the DCI when the CORESETs (search spaces or PDCCHs) do not overlap with each other in the time domain. This reduces the size of the DCI when terminal 200 does not determine the channel priority based on the priority indication, for example.

Embodiment 2

A base station and a terminal according to the present embodiment have basic configurations common to base station 100 and terminal 200 according to Embodiment 1, and thus FIGS. 8 and 9 will be used for the description.

Figure 11:
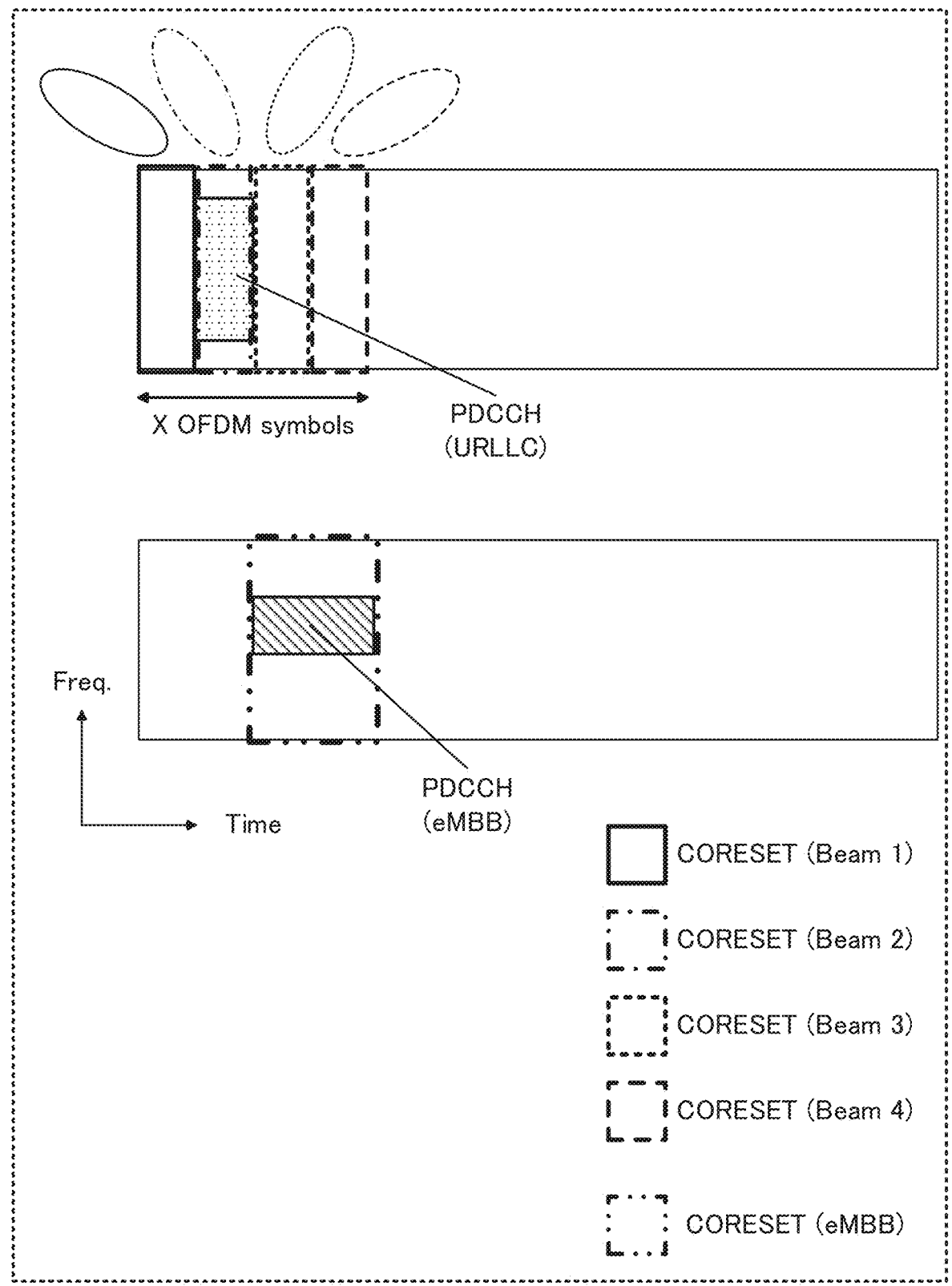
FIG. 11 illustrates an exemplary configuration of CORESETs and channels according to Embodiment 2.

Base station 100 applies transmission beamforming in the present embodiment. For example, as illustrated in FIG. 11, a plurality of CORESETs (or search spaces) are possibly configured in X consecutive OFDM symbols in a slot. For example, four CORESETs respectively corresponding to four different beams (Beam 1, Beam 2, Beam 3 and Beam 4) are configured in FIG. 11.

The procedure of transmission and reception processing in terminal 200 according to the present embodiment is, for example, the same as the procedure in Embodiment 1 (see, for example, FIG. 10). In the present embodiment, the process of ST104 illustrated in FIG. 10 is different from that in Embodiment 1.

In ST104 illustrated in FIG. 10, terminal 200 determines whether a certain condition is satisfied (ST104).

The condition in Embodiment 2 (hereinafter, referred to as "Condition B") is that a resource area (e.g., CORESET, search space, or PDCCH; the following description is based on the CORESET as an example) including at least one of DCI #1 and DCI #2 received (i.e., detected) by terminal 200 is one of a plurality of CORESETs configured in X consecutive OFDM symbols in a slot. In other words, Condition B is that at least one of DCI #1 and DCI #2 is mapped to any of the plurality of CORESETs configured in X OFDM symbols.

When Condition B is satisfied, that is, when the CORESET including at least one of DCI #1 and DCI #2 is one of the plurality of CORESETs configured in X OFDM symbols (Yes in ST104), terminal 200 determines a channel where transmission or reception is to be prioritized (i.e., channel priority) based on the priority information (priority indication) included in each DCI (ST105). In other words, terminal 200 does not determine the channel priority based on the reception (or detection) timings (or order) of DCI #1 and DCI #2 when Condition B is satisfied. For example, terminal 200 may determine that the DCIs are received at the same timing when Condition B is satisfied.

As described above, terminal 200 selects the determination method of determining the channel priority according to the priority indication when at least one of DCI #1 and DCI #2 is mapped to any one of the CORESETs configured in X OFDM symbols.

Meanwhile, when Condition B is not satisfied, e.g., when the CORESETs respectively including DCI #1 and DCI #2 do not correspond to the plurality of CORESETs configured in X OFDM symbols (No in ST104), terminal 200 determines the channel priority based on the reception (or detection) order of DCI #1 and DCI #2 (ST106). For example, terminal 200 determines that the channel assigned by the DCI received later among DCI #1 and DCI #2 takes priority over the channel assigned by the other DCI received earlier.

As described above, terminal 200 selects the determination method of determining the channel priority according to the reception order of the DCIs when at least one of DCI #1 and DCI #2 is not mapped to any one of the CORESETs configured in X OFDM symbols.

In FIG. 11, for example, the PDCCH including the DCI for URLLC is assigned to a resource earlier in the time domain than the PDCCH including the DCI for eMBB. Thus, the channel assigned by the DCI for eMBB would be configured to take priority over the channel assigned by the DCI for URLLC if terminal 200 determined the channel priority based on the reception order of the DCIs. In FIG. 11, however, the transmission beamforming (e.g., Beams 1 to 4) is applied to the DCI for URLLC as described above, and the PDCCH including the DCI for URLLC is mapped to the CORESET associated with the beam appropriate for the PDCCH (Beam 2 in FIG. 11). As a result, scheduling in the time domain is limited for the DCI (or PDCCH) to which the transmission beamforming is applied when Condition B is satisfied.

In the present embodiment, in contrast, when Condition B is satisfied, e.g., when the beamforming is applied to the DCI (or PDCCH), terminal 200 can appropriately determine the channel priority based on the priority indication regardless of the reception (detection) timings of the DCIs. In FIG. 11, for example, the channel assigned by the DCI for URLLC may be configured to take priority over the channel assigned by the DCI for eMBB based on the priority indication.

As described above, in the present embodiment, terminal 200 determines the method of determining the priority of the channels (e.g., the first channel corresponding to URLLC and the second channel corresponding to eMBB) with resource allocations overlapped with each other in the time domain, based on the information (e.g., X OFDM symbols) indicating the resources that respectively correspond to the plurality of beams configurable for the DCI.

In the present embodiment, for example, terminal 200 selects either one of the priority determination methods, which are the method according to the priority indication and the method according to the reception order of the DCIs, based on whether at least one of the DCIs respectively corresponding to the services with different requirements is mapped to the CORESETs respectively corresponding to the plurality of beams.

Thus, the present embodiment enables terminal 200 to appropriately determine the channel priority, and transmit and receive signals in the channels according to the priority, even when the channels respectively corresponding to the services with different requirements overlap with each other in the time domain and the application of the beamforming limits the scheduling of the DCI in the time domain. Consequently, the present embodiment realizes appropriate radio communication processing according to the requirements.

Note that the number X of the symbols may be configured within a range of the number of symbols in a slot (e.g., 14 symbols) in the present embodiment. Additionally, the value of X may be a value determined in the standard, or may be statically configured by cell-specific, group-specific, or UE-specific higher-layer signaling.

A time unit shorter than a slot (e.g., also referred to as a sub slot), for example, is considered to be introduced in URLLC. For example, the sub slot may be a time unit composed of seven symbols (but not limited to seven symbols). The slot described in the present embodiment may be replaced with a sub slot, for example.

Embodiment 3

A base station and a terminal according to the present embodiment have basic configurations common to base station 100 and terminal 200 according to Embodiment 1, and thus FIGS. 8 and 9 will be used for the description.

Figure 12:
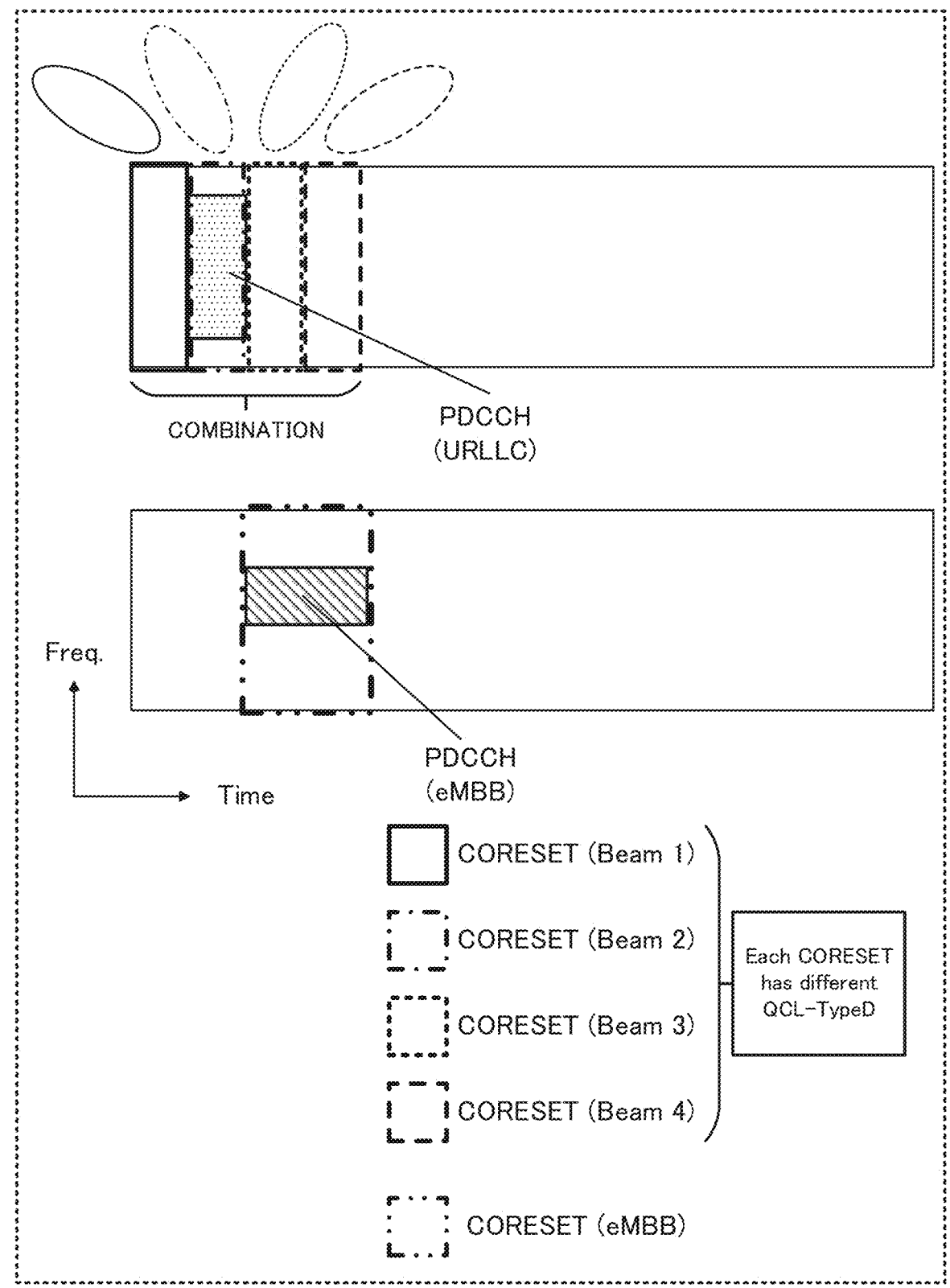
FIG. 12 illustrates an exemplary configuration of CORESETs and channels according to Embodiment 3.

Base station 100 applies transmission beamforming in the present embodiment. As illustrated in FIG. 12, for example, a plurality of resource areas (e.g., CORESETs, search spaces, or PDCCHs; the following description is based on the CORESETs as an example) with different spatial Rx parameters are possibly configured. Note that the spatial Rx parameter is sometimes referred to as Quasi Co-Location (QCL)—TypeD, for example. Different QCL—TypeDs indicate, for example, different beam configurations. For example, four CORESETs respectively corresponding to four types of the spatial Rx parameters (e.g., respectively corresponding to Beam 1, Beam 2, Beam 3, and Beam 4) are configured in FIG. 12.

In the present embodiment, a combination of CORESETs respectively having different QCL—TypeDs is defined as illustrated in FIG. 12, for example.

The procedure of transmission and reception processing in terminal 200 according to the present embodiment is, for example, the same as the procedure in Embodiment 1 (see, for example, FIG. 10). In the present embodiment, the process of ST104 illustrated in FIG. 10 is different from that in Embodiment 1.

In ST104 illustrated in FIG. 10, terminal 200 determines whether a certain condition is satisfied (ST104).

The condition in Embodiment 3 (hereinafter, referred to as "Condition C") is that a CORESET including at least one of DCI #1 and DCI #2 received (i.e., detected) by terminal 200 is included in the above-described combination of CORESETs. In other words, Condition C is that at least one of DCI #1 and DCI #2 is mapped to a CORESET in the combination of CORESETs.

When Condition C is satisfied, that is, when the CORESET including at least one of DCI #1 and DCI #2 is included in the combination of CORESETs (Yes in ST104), terminal 200 determines a channel where transmission or reception is to be prioritized (i.e., channel priority) based on the priority information (priority indication) included in each DCI (ST105). In other words, terminal 200 does not determine the channel priority based on the reception (or detection) timings (or order) of DCI #1 and DCI #2 when Condition C is satisfied. For example, terminal 200 may determine that the DCIs are received at the same timing when Condition C is satisfied.

As described above, terminal 200 selects the determination method of determining the channel priority according to the priority indication when at least one of DCI #1 and DCI #2 is mapped to any one of resources (combination of CORESETs) respectively corresponding to a plurality of QCL-TypeDs.

Meanwhile, when Condition C is not satisfied, e.g., when the CORESETs respectively including DCI #1 and DCI #2 are not included in the combination of CORESETs (No in ST104), terminal 200 determines the channel priority based on the reception (or detection) order of DCI #1 and DCI #2 (ST106). For example, terminal 200 determines that the channel assigned by the DCI received later among DCI #1 and DCI #2 takes priority over the channel assigned by the other DCI received earlier.

As described above, terminal 200 selects the determination method of determining the channel priority according to the reception order of the DCIs when at least one of DCI #1 and DCI #2 is not mapped to any one of resources (e.g., combination of CORESETs) respectively corresponding to a plurality of QCL-TypeDs.

In FIG. 12, for example, the PDCCH including the DCI for URLLC is assigned to a resource earlier in the time domain than the PDCCH including the DCI for eMBB. Thus, the channel assigned by the DCI for eMBB would be configured to take priority over the channel assigned by the DCI for URLLC if terminal 200 determined the channel priority based on the reception order of the DCIs. In FIG. 12, however, the transmission beamforming (e.g., Beams 1 to 4) is applied to the DCI for URLLC, and the PDCCH including the DCI for URLLC is mapped to the CORESET associated with the QCL-TypeD (spatial Rx parameter) appropriate for the PDCCH. As a result, scheduling in the time domain is limited for the DCI (or PDCCH) to which the transmission beamforming is applied when Condition C is satisfied.

In the present embodiment, in contrast, when Condition C is satisfied, e.g., when the beamforming is applied to the DCI (or PDCCH), terminal 200 can appropriately determine the channel priority based on the priority indication regardless of the reception (detection) timings of the DCIs. In FIG. 12, for example, the channel assigned by the DCI for URLLC may be configured to take priority over the channel assigned by the DCI for eMBB based on the priority indication.

As described above, in the present embodiment, terminal 200 determines the method of determining the priority of the channels (e.g., the first channel corresponding to URLLC and the second channel corresponding to eMBB) with resource allocations overlapped with each other in the time domain, based on the information (e.g., combination of CORESETs) indicating the resources that respectively correspond to a plurality of spatial parameters (e.g., QCL-TypeDs) configurable for the DCI.

In the present embodiment, for example, terminal 200 selects either one of the priority determination methods, which are the method according to the priority indication and the method according to the reception order of the DCIs, based on whether at least one of the DCIs respectively corresponding to the services with different requirements is mapped to the CORESET in the combination.

Thus, the present embodiment enables terminal 200 to appropriately determine the channel priority, and transmit and receive signals in the channels according to the priority, even when the channels respectively corresponding to the services with different requirements overlap with each other in the time domain and the application of the beamforming limits the scheduling of the DCI in the time domain. Consequently, the present embodiment realizes appropriate radio communication processing according to the requirements.

In terms of a method of configuring the combination of CORESETs respectively configured with different QCL-TypeDs in the present embodiment, higher-layer signaling may configure the combination including numbers of CORESETs or search spaces, for example. In addition, a time interval for a combination of CORESETs may be introduced, and the CORESETs (search spaces or PDCCHs) respectively configured with different QCL-TypeDs included in the time interval may be regarded as the combination. The time interval may be, for example, one slot or a time length other than one slot.

Further, a time unit shorter than a slot (e.g., also referred to as a sub-slot), for example, is considered to be introduced in URLLC. For example, the sub slot may be a time unit composed of seven symbols (but not limited to seven symbols). The slot described in the present embodiment may be replaced with a sub slot, for example.

Embodiment 4

A base station and a terminal according to the present embodiment have basic configurations common to base station 100 and terminal 200 according to Embodiment 1, and thus FIGS. 8 and 9 will be used for the description.

In the present embodiment, a "reference timing" for determining the channel priority is introduced, for example, in a case where resource areas (e.g., CORESETs, search spaces, or PDCCHs; the following description is based on the CORESETs as an example) respectively including DCIs are configured to be overlapped with each other in the time domain when terminal 200 receives (or detects) the DCIs (in other words, in the case of Condition A).

The reference timing may be, for example, a starting symbol position or an ending symbol position configured in a CORESET.

Figure 13:
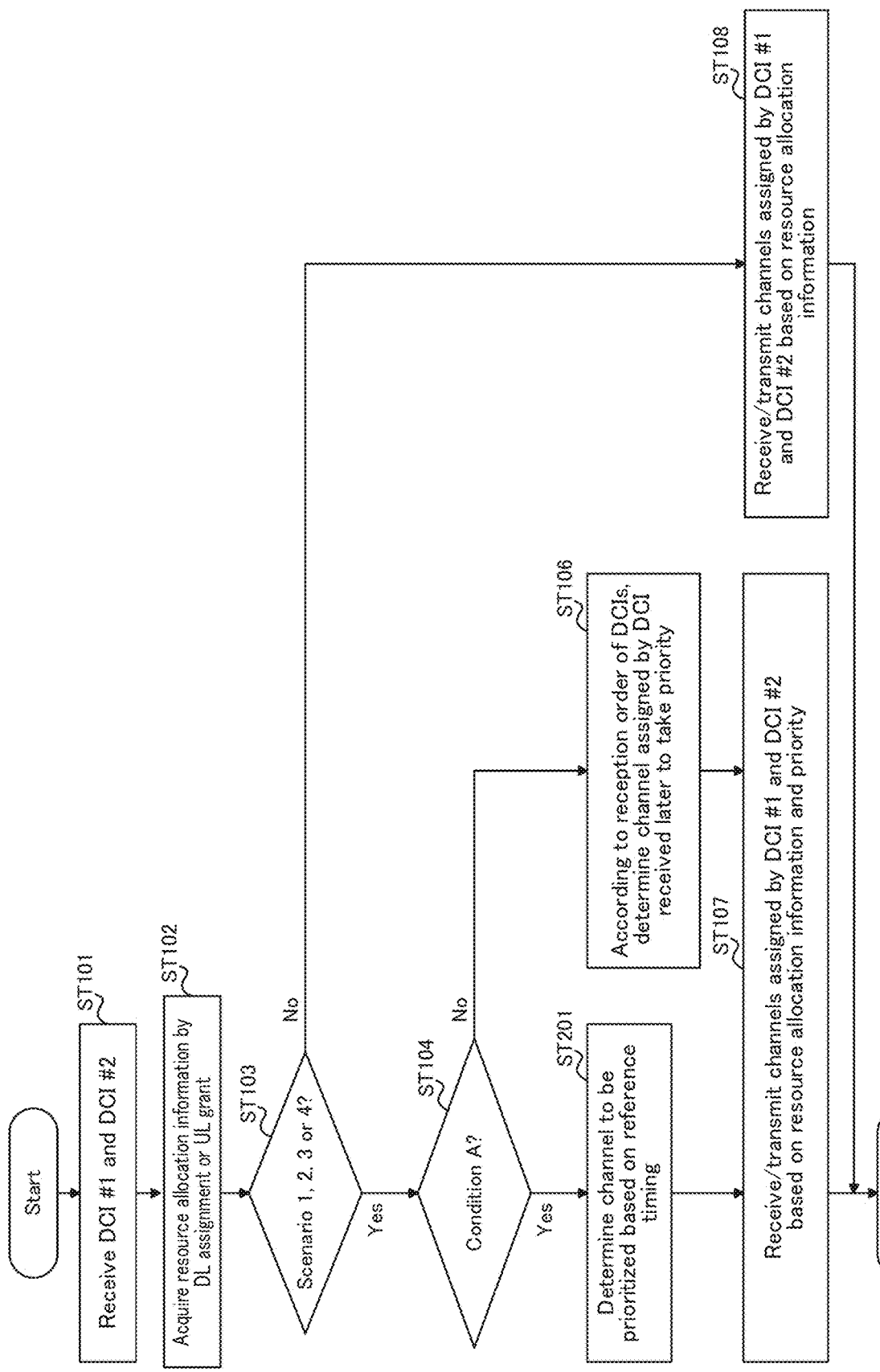
FIG. 13 is a flowchart describing an exemplary operation of a terminal according to Embodiment 4.

FIG. 13 illustrates an exemplary procedure of transmission/reception processing in terminal 200 according to the present embodiment. Note that, in FIG. 13, the same processes as those in Embodiment 1 (e.g., FIG. 10) are denoted by the same reference signs, and the descriptions thereof are omitted. In FIG. 13, for example, the process of ST201 is different from that in Embodiment 1 (e.g., process of ST105 in FIG. 10).

When Condition A is satisfied in FIG. 13, that is, when the CORESETs respectively including DCI #1 and DCI #2 are configured to be overlapped with each other in the time domain (Yes in ST104), terminal 200 determines a channel where transmission or reception is to be prioritized (i.e., channel priority) based on the reference timings respectively corresponding to the CORESETs each including the DCI (ST201). For example, terminal 200 determines that the priority is given to the channel assigned by the DCI, among DCI #1 and DCI #2, with the reference timing later in the time domain.

As described above, when the CORESETs respectively including DCI #1 and DCI #2 overlap with each other in the time domain, terminal 200 selects the determination method of determining the channel priority based on the information on the positions of the resources (e.g., CORESETs, search spaces, or PDCCHs) respectively corresponding to DCI #1 and DCI #2 in the time domain.

Meanwhile, terminal 200 selects the determination method of determining the channel priority according to the reception order of the DCIs when the CORESETs respectively including DCI #1 and DCI #2 do not overlap with each other in the time domain (ST106 in FIG. 13).

As described above, in the present embodiment, terminal 200 determines the method of determining the priority of the channels (e.g., the first channel corresponding to URLLC and the second channel corresponding to eMBB) with resource allocations overlapped with each other in the time domain, based on the information (i.e., parameter on control information) indicating the resources, such as the CORESETs, the search spaces, and the PDCCHs, corresponding to the DCIs respectively indicating the assignments of the first channel and the second channel.

In the present embodiment, for example, terminal 200 selects either one of the priority determination methods, which are the method according to the reference timings of the CORESETs respectively corresponding the DCIs and the method according to the reception order of the DCIs, based on whether the CORESETs respectively corresponding to the DCIs corresponding to the respective services with different requirements overlap with each other in the time domain.

This allows terminal 200 to appropriately determine the channel priority based on the reception order of the DCIs when the CORESETs respectively including the plurality of DCIs are not overlapped with each other in the time domain. This also allows terminal 200 to clearly determine the channel to be prioritized based on the reference timings of the CORESETs, even when the CORESETs respectively including the plurality of DCIs are overlapped with each other in the time domain. In other words, terminal 200 can more easily determine the channel priority without an indication from base station 100.

Thus, the present embodiment enables terminal 200 to appropriately determine the channel priority and transmit and receive signals in the channels according to the priority, even when the channels respectively corresponding to the services with different requirements overlap with each other in the time domain. Consequently, the present embodiment realizes appropriate radio communication processing according to the requirements.

Variation of Embodiment 4

The parameter that determines the channel priority is not limited to the reference timing (e.g., the position of a resource area including a DCI in the time domain).

When a plurality of resource areas (e.g., CORESETs, search spaces, or PDCCHs; the following description is based on the CORESETs as an example) are configured to be overlapped with each other in the time domain, the starting symbols (or the ending symbols) respectively configured for the CORESETs are possibly configured in the same position as illustrated in FIG. 5, for example. In this case, the time length or the number of symbols configured for the CORESET (i.e., length of CORESET in the time domain) may be configured as the parameter for determining the channel priority, for example.

Terminal 200 may prioritize, for example, the channel assigned by the DCI transmitted in the CORESET with a shorter time length or a less number of symbols of the CORESET. In the example illustrated in FIG. 5, for example, the time length of the CORESET for URLLC is shorter than the time length of the CORESET for eMBB. Thus, in the example illustrated in FIG. 5, the channel assigned by the DCI transmitted in the CORESET for URLLC may be configured to take priority over the channel assigned by the DCI transmitted in the CORESET for eMBB.

Further, the parameter for determining the channel priority may include both the reference timing and the time length (e.g., the number of symbols) of a CORESET.

For example, in the case where the CORESETs respectively including DCIs are configured to be overlapped in the time domain when terminal 200 receives (or detects) the DCIs, terminal 200 determines the channel priority based on the reference timings first. When the reference timings (or priority) are the same at this time, terminal 200 may determine that the channel assigned by the DCI in the CORESET with a shorter time length (or less number of symbols) takes priority.

Alternatively, in the case where the CORESETs respectively including DCIs are configured to be overlapped in the time domain when terminal 200 receives (or detects) the DCIs, terminal 200 determines the channel priority based on the time length of the CORESETs first. When the reference timings (or priority) are the same at this time, terminal 200 may determine that the channel assigned by the DCI with a later reference timing takes priority.

Embodiment 5

A base station and a terminal according to the present embodiment have basic configurations common to base station 100 and terminal 200 according to Embodiment 1, and thus FIGS. 8 and 9 will be used for the description.

As described above, a CORESET or search spaces, for example, are configured to terminal 200 for a PDCCH, which is a control channel for transmitting a DCI, for example. Terminal 200 monitors the search spaces, which are positions of PDCCH candidates in the CORESET, and detects the DCI addressed to terminal 200. Further, different CORESETs (search spaces or PDCCHs) are possibly configured to terminal 200 for the services with different requirements.

In the present embodiment, it is not supported to configure, to terminal 200, a plurality of CORESETs to be overlapped with each other in the time domain. In other words, a plurality of CORESETs configured to terminal 200 are configured without being overlapped in the time domain.

According to the present embodiment, terminal 200 can sequentially receive the DCIs since the CORESETs (search spaces or PDCCHs) respectively including the DCIs are not configured to be overlapped with each other in the time domain when terminal 200 receives (or detects) the DCIs. Thus, terminal 200 can determine the priority of the channels respectively assigned by the DCIs based on, for example, the reception timings (i.e., reception order) of the DCIs. For example, terminal 200 can clearly distinguish the reception timings of the DCIs and clearly determine the channel to be prioritized since the CORESETs are not configured to be overlapped with each other in the time domain.

Thus, the present embodiment enables terminal 200 to appropriately determine the channel priority and transmit and receive signals of the channels according to the priority, even when the channels respectively corresponding to the services with different requirements overlap with each other in the time domain.

Consequently, the present embodiment realizes appropriate radio communication processing according to the requirements.

Embodiment 6

A base station and a terminal according to the present embodiment have basic configurations common to base station 100 and terminal 200 according to Embodiment 1, and thus FIGS. 8 and 9 will be used for the description.

In each of Embodiments 1 to 3, for example, terminal 200 determines the channel priority based on the priority indications indicated by the DCIs under a certain condition (e.g., Condition A, B, or C).

It is possible, however, that the overlapped channels assigned to terminal 200 in the time domain have the same priority. A description will be given of a case where "1" indicates higher priority and "0" indicates lower priority in the priority indication, for example. In this case, when the priority indications of both the DCIs (DCI #1 and DCI #2) for the respective services with different requirements indicate the same value (1 or 0), terminal 200 determines that the channels respectively assigned by DCI #1 and DCI #2 have the same priority.

It is also possible that the overlapped channels assigned to terminal 200 in the time domain may include a channel assigned by a DCI that includes no priority indication.

In a case where terminal 200 supports a plurality of services (e.g., eMBB and URLLC) with different requirements, for example, a DCI including the priority indication (i.e., newly introduced DCI) is possibly configured for URLLC. For eMBB, however, a DCI including no priority indication (i.e., existing NR DCI) is assumed to be configured sometimes. In this case, the priority indication is sometimes not included in the DCI assigning at least one of the channels for the plurality of services with different requirements.

With this regard, methods of determining the channel priority in these cases will be described in the present embodiment.

Operation Examples 1 and 2 for terminal 200 according to the present embodiment will be each described below.

Operation Example 1

Operation Example 1 will provide a description of an exemplary operation of terminal 200 in the case where the channels with the same priority overlap with each other in the time domain.

Figure 14:
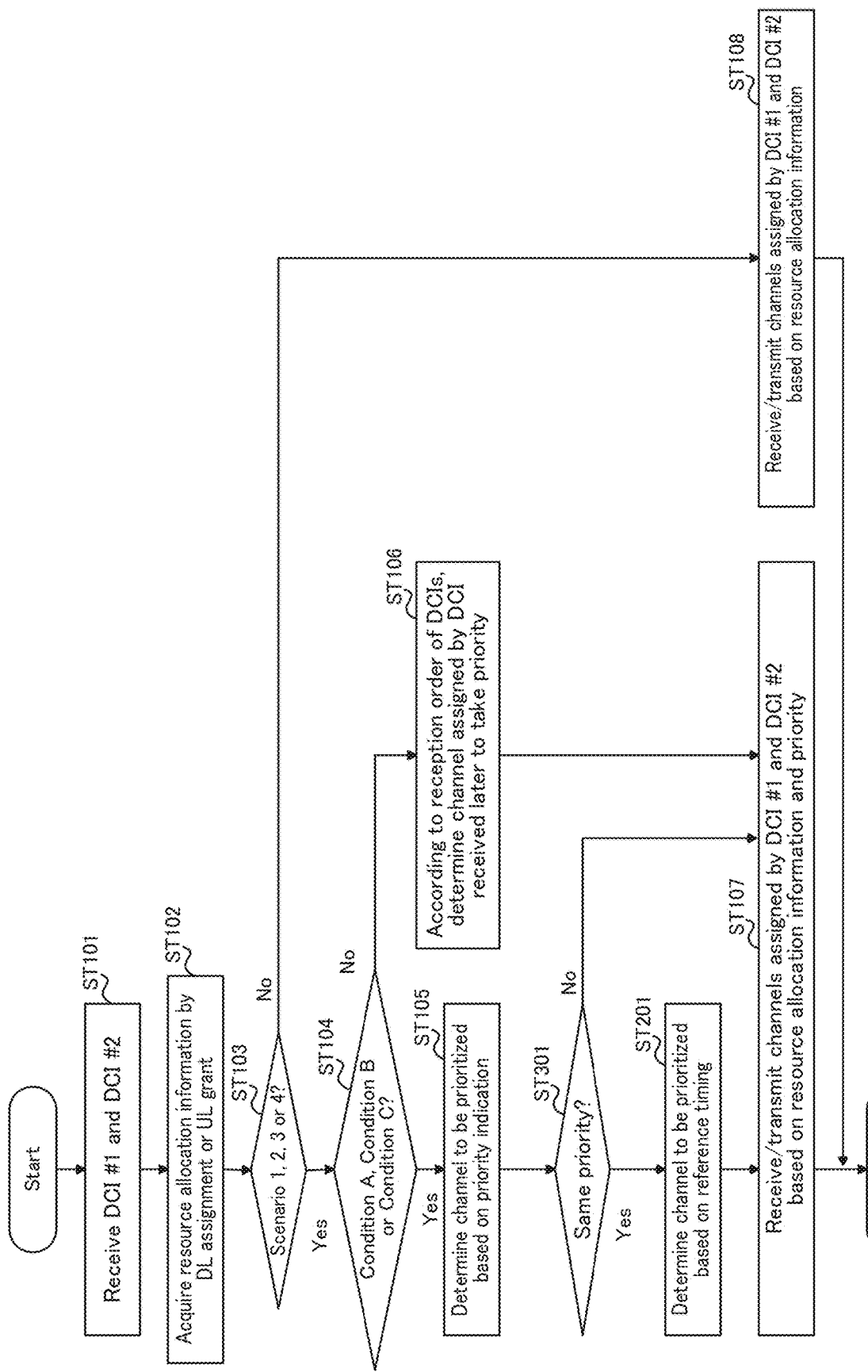
FIG. 14 is a flowchart describing an exemplary operation of a terminal according to Embodiment 6.

FIG. 14 illustrates an exemplary procedure of transmission/reception processing in terminal 200 according to the present embodiment. Note that, in FIG. 14, the same processes as those in Embodiment 1 (e.g., FIG. 10) or Embodiment 4 (e.g., FIG. 13) are denoted by the same reference signs, and the descriptions thereof are omitted.

In FIG. 14, when a certain condition (e.g., Condition A, Condition B or Condition C) is satisfied (Yes in ST104), terminal 200 determines the channel where transmission or reception is to be prioritized based on the priority indication included in each DCI (ST105). Terminal 200 determines here whether the channels are determined to have the same priority by the priority indication indicated by each DCI (ST301). In other words, terminal 200 determines whether the channel priority can be clearly determined by the process of ST105. When the priority indications (priority) indicated by the DCIs are not the same (No in ST301), terminal 200 performs the process of ST107.

When the priority indications (priority) indicated by the DCIs are the same (Yes in ST301), in contrast, terminal 200 determines the channel priority based on the positions (e.g., reference timings; or time lengths (or the number of symbols)) of the resources (e.g., CORESETs, search spaces or PDCCHs) respectively corresponding to the DCIs in the time domain (ST201), as in Embodiment 4, for example.

In other words, as illustrated in FIG. 14, for example, when the channels are determined to have the same priority based on the priority indications as in any of Embodiments 1 to 3, terminal 200 may proceed to the priority determination process based on the reference timings as in Embodiment 4.

Figure 15:
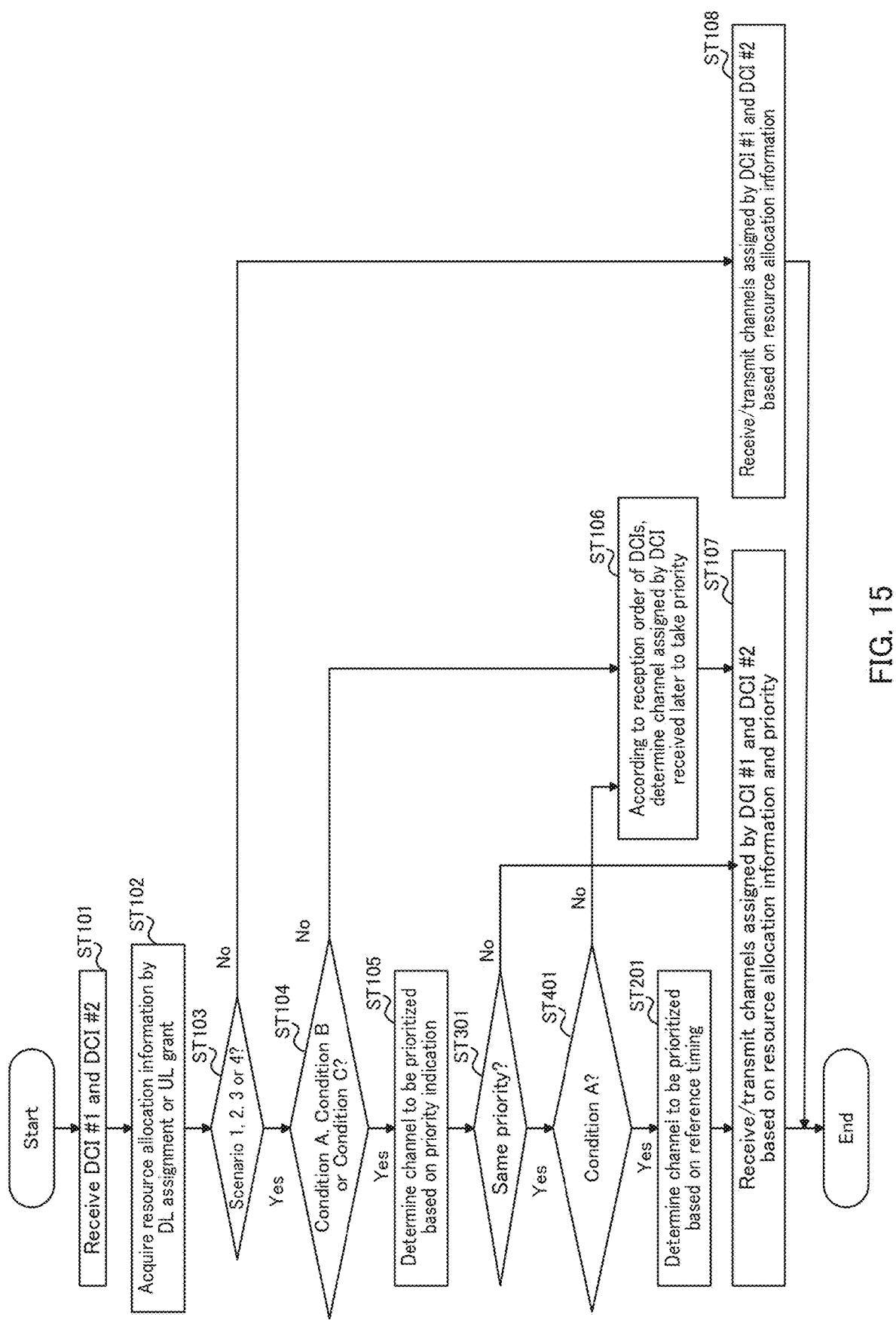
FIG. 15 is a flowchart describing another exemplary operation of the terminal according to Embodiment 6.

FIG. 15 illustrates another exemplary procedure of transmission/reception processing in terminal 200 according to the present embodiment. Note that, in FIG. 15, the same processes as those in FIG. 14 are denoted by the same reference signs, and the descriptions thereof are omitted.

In FIG. 15, for example, the operation is different from that in FIG. 14 when the channels are determined to have the same priority by the priority indication indicated by each DCI (Yes in ST301).

In FIG. 15, when the priority indications (priority) indicated by the DCIs are the same (Yes in ST301), terminal 200 determines whether Condition A is satisfied, or either Condition B or Condition C is satisfied (ST401). In other words, terminal 200 determines whether the CORESETs (search spaces or PDCCHs) respectively corresponding to the DCIs overlap with each other in the time domain.

When the CORESETs (search spaces or PDCCHs) respectively corresponding to the DCIs overlap with each other in the time domain, e.g., in the case of Condition A (Yes in ST401), terminal 200 may determine the channel priority based on the reference timings (ST201), for example, as in Embodiment 4. In other words, when the channels are determined to have the same priority based on the priority indications as in any of Embodiments 1 to 3, and the CORESETs (search spaces or PDCCHs) respectively including the DCIs are configured to be overlapped in the time domain, for example, terminal 200 may proceed to the priority determination process based on the reference timings as in Embodiment 4.

Meanwhile, when the CORESETs (search spaces or PDCCHs) respectively corresponding to the DCIs do not overlap with each other in the time domain in FIG. 15, e.g., in the case of Condition B or Condition C (No in ST401), terminal 200 may determine the channel priority based on the reception order of the DCIs, for example.

Operation Example 2

Operation Example 2 will provide a description of an exemplary operation of terminal 200 in the case where the priority indication is not included in the DCI assigning at least one of the channels for the plurality of services with different requirements.

For example, terminal 200 receives (or detects) the DCIs (e.g., DCI #1 and DCI #2) for the services with different requirements.

At this time, it is possible that one of DCI #1 and DCI #2 (e.g., DCI #1) includes the priority indication, and the other DCI (e.g., DCI #2) includes no priority indication.

When the priority indication of DCI #1 is 1 (e.g., indicating high priority) in this case, terminal 200 may determine that the channel assigned by DCI #1 takes priority over the channel assigned by DCI #2, for example.

When the priority indication of DCI #1 is 0 (e.g., indicating low priority), in contrast, terminal 200 may determine that the channel assigned by DCI #2 takes priority over the channel assigned by DCI #1, for example. Alternatively, terminal 200 may determine that the channels respectively assigned by DCI #1 and DCI #2 have the same priority in this case.

Further, when neither DCI #1 nor DCI #2 includes the priority indication, terminal 200 may determine that the channels respectively assigned by DCI #1 and DCI #2 have the same priority.

Note that terminal 200 may perform the operation illustrated in FIG. 14 or FIG. 15 as described above, for example, when determining that the channels respectively assigned by DCI #1 and DCI #2 have the same priority.

Operation Examples 1 and 2 have been described, thus far.

As described above, the present embodiment allows terminal 200 to appropriately
determine the channel priority and transmit and receive signals in the channels according to the priority, even when the channels are determined to have the same priority by the priority indications or when at least one of the plurality of DCIs indicated to terminal 200 includes no priority indication. Consequently, the present embodiment realizes appropriate radio communication processing according to the requirements.

Embodiments of the present disclosure have been described, thus far.

Other Embodiments

1. NR supports Carrier Aggregation, for example.

The carrier aggregation supports, for example, the operation called "cross-carrier scheduling". In the cross-carrier scheduling, a carrier where a PDCCH is transmitted is different from a carrier where a PDSCH assigned by the PDCCH is transmitted, for example.

The carrier aggregation also supports the cross-carrier scheduling between carriers with different numerologies (i.e., subcarrier spacing (SCS)), for example.

Figure 16:
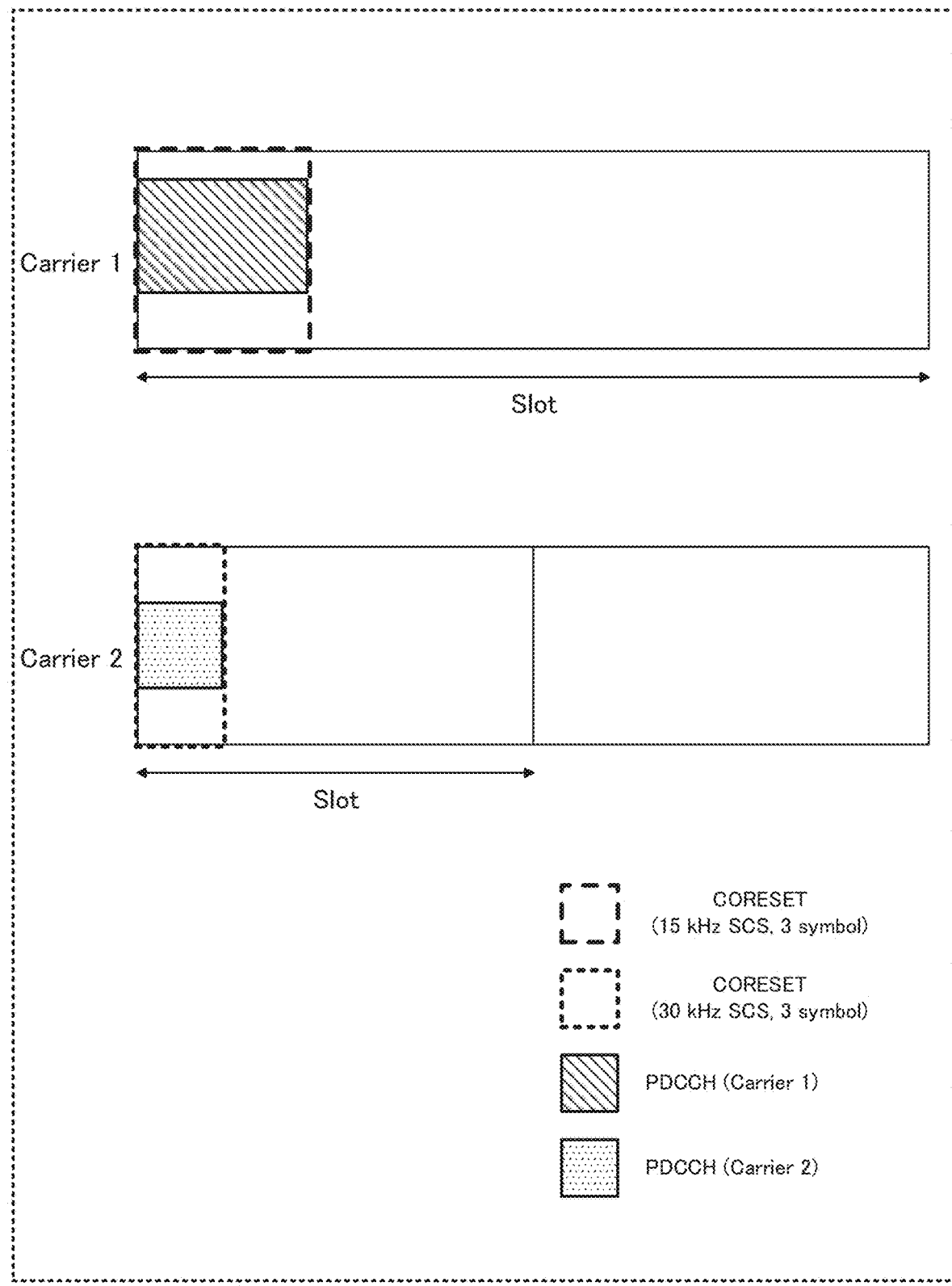
FIG. 16 illustrates exemplary carriers with different subcarrier spacing.

FIG. 16 illustrates exemplary cross-carrier scheduling between carriers with different numerologies.

In the example illustrated in FIG. 16, CORESETs (or search spaces or PDCCHs) with the same number of symbols (e.g., three symbols) are respectively configured for the carriers (e.g., Carrier 1 with 15 kHz SCS and Carrier 2 with 30 kHz SCS). As illustrated in FIG. 16, the CORESET (or search space or PDCCH) lengths (time lengths) are different between the carriers with different numerologies even though the number of symbols in the CORESETs is the same. In FIG. 16, the time length (e.g., three symbols) of the CORESET in Carrier 2 is shorter than the time length (e.g., three symbols) of the CORESET in Carrier 1.

The status of the two CORESETs illustrated in FIG. 16 corresponds to, for example, the status of the plurality of CORESETs illustrated in FIG. 5 configured to be overlapped with each other in the time domain. Thus, in the cross-carrier scheduling between carriers with different numerologies, for example, terminal 200 may operate based on at least one of Embodiments 1, 4, and 6, for example, in a case where the PDSCHs respectively scheduled from the carriers overlap with each other in the same carrier in the time domain.

2. NR supports Carrier Aggregation, for example. In inter-band carrier aggregation in NR, for example, terminal 200 allows for a case of having a receive slot timing difference (i.e., time difference) between different carriers (see, for example, NPL 5). For example, terminal 200 allows for a receive slot timing difference of up to 33 us in frequency range (FR) 1 (e.g., 6 GHz or less).

Figure 17:
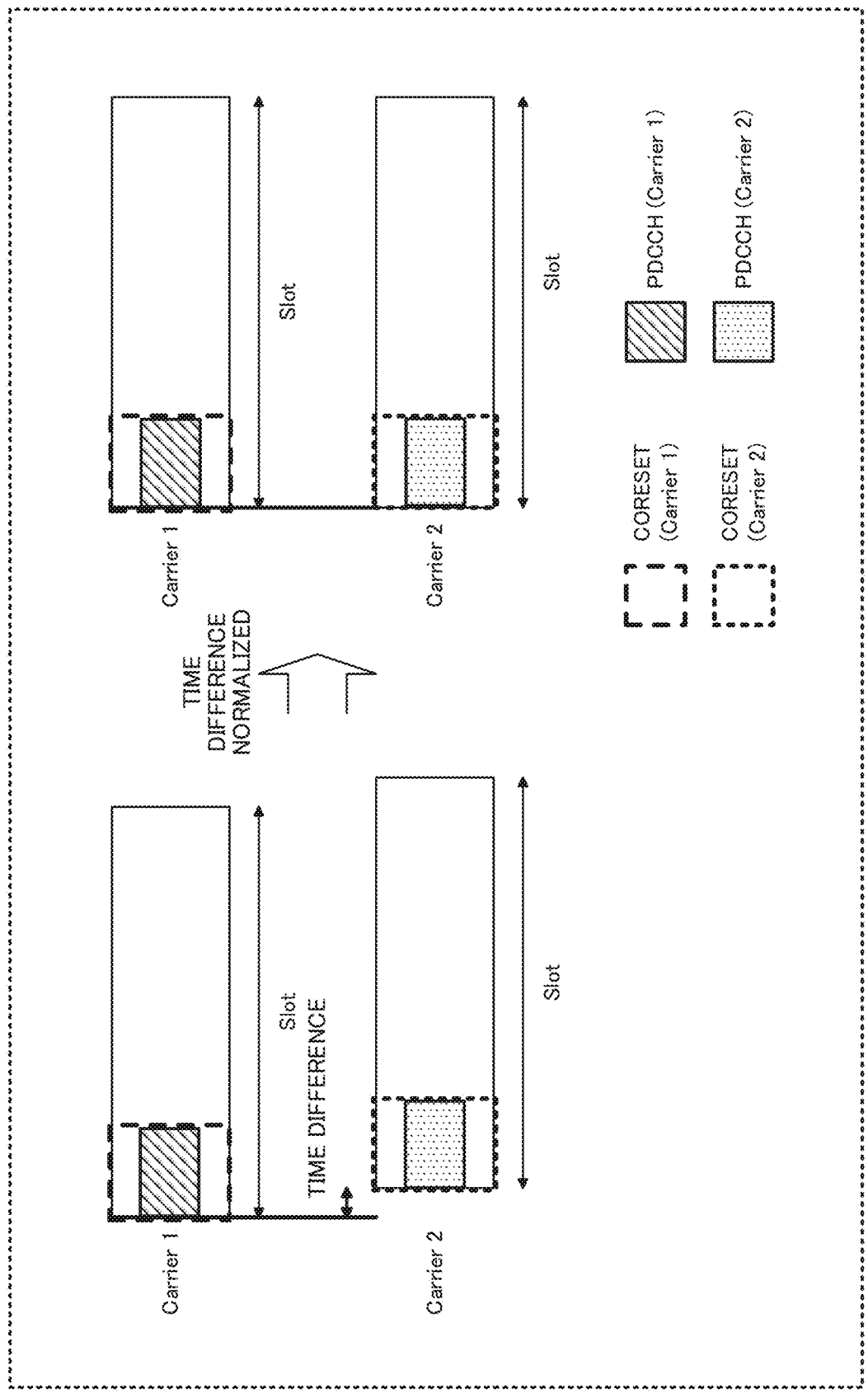
FIG. 17 illustrates exemplary time difference normalization between carriers.

In a case where there is a receive slot timing difference between carriers when terminal 200 determines the channel priority based on the reception timings of DCIs, for example, terminal 200 may determine the reception timings of the DCIs after adjusting the receive slot timings by normalizing the receive slot timing difference (i.e., time difference), instead of the reception timings of the DCIs in the absolute time, as illustrated in FIG. 17.

3. Each of the above-described embodiments has provided a description of the method of determining the channel priority by terminal 200 when channels (i.e., reception resources or transmission resources) for services with different requirements overlap with each other in the time domain.

Terminal 200 may perform the following operations in the scenarios described above (each of Scenarios 1 to 4), for example, after determining the channel priority.

<Scenario 1 (See, for Example, FIG. 1)>

When terminal 200 cannot simultaneously receive (or perform demodulation and decoding on) a plurality of PDSCHs, terminal 200 receives (or performs demodulation and decoding on) a high-priority PDSCH. Meanwhile, terminal 200 does not receive (or perform demodulation and decoding on) a low-priority PDSCH. In addition, terminal 200 may generate NACK for the low-priority PDSCH, which is not received (or performed demodulation and decoding on), and feed back to base station 100.

<Scenario 2 (see, for example, FIG. 2)>

When terminal 200 cannot simultaneously transmit a plurality of PUSCHs, terminal 200 transmits a high-priority PUSCH and does not transmit a low-priority PUSCH.

Alternatively, terminal 200 may control (scale) the transmit power for the low-priority PUSCH in a case where terminal 200 can simultaneously transmit a plurality of PUSCHs but the sum of the transmit power exceeds the maximum transmit power.

<Scenario 3 (See, for Example, FIG. 3)>

When terminal 200 cannot simultaneously transmit a plurality of PUCCHs, terminal 200 transmits a PUCCH including ACK/NACK for a high-priority channel. Meanwhile, terminal 200 may drop (i.e., need not transmit) ACK/NACK for a low-priority channel.

Alternatively, terminal 200 may transmit both the ACK/NACKs in a single PUCCH by multiplexing the ACK/NACK for the low-priority channel to the ACK/NACK for the high-priority channel. In this case, terminal 200 may multiplex to the PUCCH in order from the ACK/NACK for the high-priority channel. Further, terminal 200 may multiplex the ACK/NACK for the low-priority channel to the PUCCH when there is room in resources configured for the PUCCH.

Terminal 200 may also control (scale) the transmit power for the low-priority PUCCH in a case where terminal 200 can simultaneously transmit a plurality of PUCCHs but the sum of the transmit power exceeds the maximum transmit power.

<Scenario 4 (See, for Example, FIG. 4)>

When terminal 200 cannot simultaneously transmit a PUSCH and a PUCCH, terminal 200 may transmit a high-priority channel (PUSCH or PUCCH) and drop (i.e., need not transmit) a low-priority channel (PUSCH or PUCCH).

Alternatively, terminal 200 may multiplex ACK/NACK to the PUSCH and transmit the PUSCH.

Terminal 200 may also control (scale) the transmit power for the low-priority channel (PUSCH or PUCCH) in a case where terminal 200 can simultaneously transmit a plurality of PUSCH and PUCCH but the sum of the transmit power exceeds the maximum transmit power.

4. The priority indication is not limited to the explicit indication by a DCI, and may be an implicit indication.

For example, the priority indication may be implicitly indicated by a DCI format, an RNTI or a search space, and terminal 200 may determine the channel priority based on the DCI format, the RNTI or the search space.

In a case of the DCI format, for example, when receiving a DCI in a DCI format introduced for URLLC, terminal 200 may determine that the channel assigned by the DCI takes priority over the channel assigned by a DCI in another DCI format.

In a case of the RNTI, for example, when the detected RNTI is different from a C-RNTI, e.g., when the detected RNTI is an MCS-C-RNTI introduced for URLLC in Rel. 15 or an RNTI newly introduced for URLLC, terminal 200 may determine that the channel assigned by the corresponding DCI takes priority over the channel assigned by another DCI.

In a case of the search space, terminal 200 may determine the priority of channels respectively assigned by DCIs based on search space numbers configured for the search spaces where the DCIs are detected.

The implicit indication of the priority indication (e.g., channel priority) reduces the amount of signaling.

Note that the methods of implicitly indicating the priority indication are not limited to these. The method only requires, for example, that a parameter that allows terminal 200 to determine the priority of channels (e.g., eMBB and URLLC) is associated with the channel priority.

5. In each of the above embodiments, the downlink control channel, the downlink data channel, the uplink control channel, and the uplink data channel are not limited to PDCCH, PDSCH, PUCCH, and PUSCH respectively, and may be a control channel of another name.

6. The time resource unit is not limited to the time resource described in each of the above embodiments (e.g., slot or subslot), and may be another time resource unit such as a subframe or a frame.

7. The services with different requirements are not limited to eMBB and URLLC, and may be other services.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal according to an embodiment of the present disclosure includes: control circuitry, which, in operation, determines a method of determining priority of a first channel and a second channel with resource allocations overlapped with each other in time domain, based on a parameter on control information portions respectively indicating assignment of the first channel and assignment of the second channel; and communication circuitry, which, in operation, transmits or receives a signal for at least one of the first channel and/or the second channel based on the priority.

In the terminal according to an embodiment of the present disclosure, the control circuitry selects, based on the parameter, either one of a first determination method of determining the priority based on indication information that is received from a base station and that indicates the priority, or a second determination method of determining the priority based on reception order of the control information portions.

In the terminal according to an embodiment of the present disclosure, the parameter includes information indicating resources that respectively correspond to the control information portions, and the control circuitry selects the first determination method when the resources that respectively correspond to the control information portions overlap with each other in the time domain.

In the terminal according to an embodiment of the present disclosure, the control circuitry selects the second determination method when the resources that respectively correspond to the control information portions do not overlap with each other in the time domain.

In the terminal according to an embodiment of the present disclosure, the parameter includes information indicating resources that respectively correspond to a plurality of beams configurable for the control information portions, and the control circuitry selects the first determination method when at least one of the control information portions is mapped to any one of the resources that respectively correspond to the plurality of beams.

In the terminal according to an embodiment of the present disclosure, the control circuitry selects the second determination method when at least one of the control information portions is not mapped to any one of the resources that respectively correspond to the plurality of beams.

In the terminal according to an embodiment of the present disclosure, the parameter includes information indicating resources that respectively correspond to a plurality of special parameters configurable for the control information portions, and the control circuitry selects the first determination method when at least one of the control information portions is mapped to any one of the resources that respectively correspond to the plurality of special parameters.

In the terminal according to an embodiment of the present disclosure, the control circuitry selects the second determination method when at least one of the control information portions is not mapped to any one of the resources that respectively correspond to the plurality of special parameters.

In the terminal according to an embodiment of the present disclosure, the parameter includes information indicating resources that respectively correspond to the control information portions, and the control circuitry determines the priority based on information on at least one of positions and/or lengths in the time domain of the resources that respectively correspond to the control information portions when the resources that respectively correspond to the control information portions overlap with each other in the time domain.

In the terminal according to an embodiment of the present disclosure, the control circuitry determines the priority based on reception order of the control information portions when the resources that respectively correspond to the control information portions do not overlap with each other in the time domain.

In the terminal according to an embodiment of the present disclosure, the control circuitry determines the priority based on information on at least one of positions and/or lengths in the time domain of resources that respectively correspond to the control information portions, when the first channel and the second channel are determined to have the same priority.

In the terminal according to an embodiment of the present disclosure, the control circuitry determines the priority based on information on at least one of positions and/or lengths in the time domain of resources that respectively correspond to the control information portions, when the first channel and the second channel are determined to have the same priority, and the resources that respectively correspond to the control information portions overlap with each other in the time domain.

In the terminal according to an embodiment of the present disclosure, the control circuitry determines the priority based on reception order of the control information portions when the first channel and the second channel are determined to have the same priority, and the resources that respectively correspond to the control information portions do not overlap with each other in the time domain.

A communication method according to an embodiment of the present disclosure includes: determining a method of determining priority of a first channel and a second channel with resource allocations overlapped with each other in time domain, based on a parameter on control information portions respectively indicating assignment of the first channel and assignment of the second channel; and transmitting or receiving a signal for at least one of the first channel and/or the second channel based on the priority.

The disclosures of U.S. Provisional Application No. 62/839,128, filed on Apr. 26, 2019, and Japanese Patent Application No. 2019-089057, filed on May 9, 2019, including the specifications, drawings and abstracts, are incorporated herein by reference in their entirety.

INDUSTRIAL APPLICABILITY

An exemplary embodiment of the present disclosure is useful for mobile communication systems.

REFERENCE SIGNS LIST

100 Base station
101, 205 Controller
102 Higher-layer control signal generator
103 Downlink control information generator
104, 206 Encoder
105, 207 Modulator
106, 208 Signal assigner
107, 209 Transmitter
108, 201 Receiver
109, 202 Extractor
110, 203 Demodulator
111, 204 Decoder
200 Terminal

The invention claimed is:

1. An integrated circuit, comprising:
a reception circuitry, which, in operation, controls a reception of a first downlink control information and a second downlink control information, the first downlink control information indicating an assignment of a first channel, the second downlink control information indicating an assignment of a second channel; and
communication circuitry, which, in operation, controls a transmission or a reception of at least one of the first channel or the second channel based on a first priority value of the first channel and on a second priority value of the second channel,
wherein,
the first priority value is determined based on a priority parameter of the first downlink control information, and the second priority value is determined based on the second downlink control information which does not include the priority parameter, and
in a case where the first priority value is a small value among a plurality of priority values, the first priority value of the first channel is same as the second priority value of the second channel.

2. The integrated circuit according to claim 1, wherein, in a case where the transmission of the first channel of a large priority value overlaps in time with the transmission of the second channel of a small priority value, the communication circuitry cancels the transmission of the second channel.

3. The integrated circuit according to claim 1, wherein, in a case where the priority parameter indicates a large priority value and the transmission of the first channel overlaps in time with the transmission of the second channel, the communication circuitry cancels the transmission of the second channel.

4. The integrated circuit according to claim 1, wherein the plurality of priority values include two priority values.

5. The integrated circuit according to claim 1, wherein, in a case where neither the first downlink control information or the second downlink control information includes the priority parameter, the first priority value of the first channel is same as the second priority value of the second channel.

6. The integrated circuit according to claim 1, wherein, the first channel is a physical uplink shared channel (PUSCH) and the second channel is a physical uplink control channel (PUCCH), and in a case where the transmission of the first channel of a large priority value overlaps in time with the transmission of the second channel of a small priority value, the communication circuitry cancels the transmission of the second channel.

7. The integrated circuit according to claim 1, wherein, the first channel and the second channel are physical uplink control channels (PUCCHs), and in a case where the transmission of the first channel of a large priority value overlaps in time with the transmission of the second channel of a small priority value, the communication circuitry cancels the transmission of the second channel.

8. The integrated circuit according to claim 1, wherein at least one of the first priority value is indicated by 1 bit of the first downlink control information, or the second priority value is indicated by 1 bit of the second downlink control information.

* * * * *